US012191757B2

(12) United States Patent
Nishibata et al.

(10) Patent No.: US 12,191,757 B2
(45) Date of Patent: Jan. 7, 2025

(54) CONTROL CIRCUIT FOR POWER CONVERTER

(71) Applicant: DENSO CORPORATION, Kariya (JP)

(72) Inventors: Kouichi Nishibata, Kariya (JP); Masanori Yamamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 219 days.

(21) Appl. No.: 17/888,186

(22) Filed: Aug. 15, 2022

(65) Prior Publication Data

US 2022/0393572 A1 Dec. 8, 2022

Related U.S. Application Data

(63) Continuation of application No. PCT/JP2021/003041, filed on Jan. 28, 2021.

(30) Foreign Application Priority Data

Feb. 13, 2020 (JP) ................................ 2020-022527

(51) Int. Cl.
*H02M 1/32* (2007.01)
*H02M 1/08* (2006.01)
*H02M 1/36* (2007.01)
*H02M 7/5387* (2007.01)

(52) U.S. Cl.
CPC ............ *H02M 1/322* (2021.05); *H02M 1/08* (2013.01); *H02M 1/36* (2013.01); *H02M 7/53871* (2013.01)

(58) Field of Classification Search
CPC ..... H02M 1/08–096; H02M 1/32–327; H02M 1/36; H02M 7/5387–5395
See application file for complete search history.

(56) References Cited

U.S. PATENT DOCUMENTS

| | | | |
|---|---|---|---|
| 2011/0234176 A1* | 9/2011 | Nakamura | ........ H02M 7/53871 320/166 |
| 2012/0020136 A1 | 1/2012 | Akaishi et al. | |
| 2013/0207619 A1 | 8/2013 | Viancino et al. | |
| 2014/0191693 A1* | 7/2014 | Funaba | ................... H02P 27/06 318/139 |
| 2017/0355267 A1 | 12/2017 | Zhou et al. | |
| 2024/0006978 A1* | 1/2024 | Onda | ..................... H02M 1/32 |

FOREIGN PATENT DOCUMENTS

| | | |
|---|---|---|
| JP | H10-262376 A | 9/1998 |
| JP | 2006-042459 A | 2/2006 |

* cited by examiner

*Primary Examiner* — Fred E Finch, III
(74) *Attorney, Agent, or Firm* — Oliff PLC

(57) ABSTRACT

A control circuit for a power converter is applicable to a system that includes a power supply, a power converter, an interruption switch, a smoothing capacitor, and a series-connection body made of a discharge resistor and a discharge switch. In the control circuit, a discharge command unit outputs a discharge command for the smoothing capacitor. A discharge drive command unit outputs a drive command for the discharge switch based on the discharge command outputted from the discharge command unit. A drive circuit is connected to a gate of the discharge switch and performs drive control of the discharge switch based on the drive command outputted from the discharge drive command unit. An operation detecting unit detects a signal related to driving of the drive switch. A discharge determining unit determines whether the discharge drive command unit is normal based on a detected signal of the operation detecting unit.

9 Claims, 19 Drawing Sheets

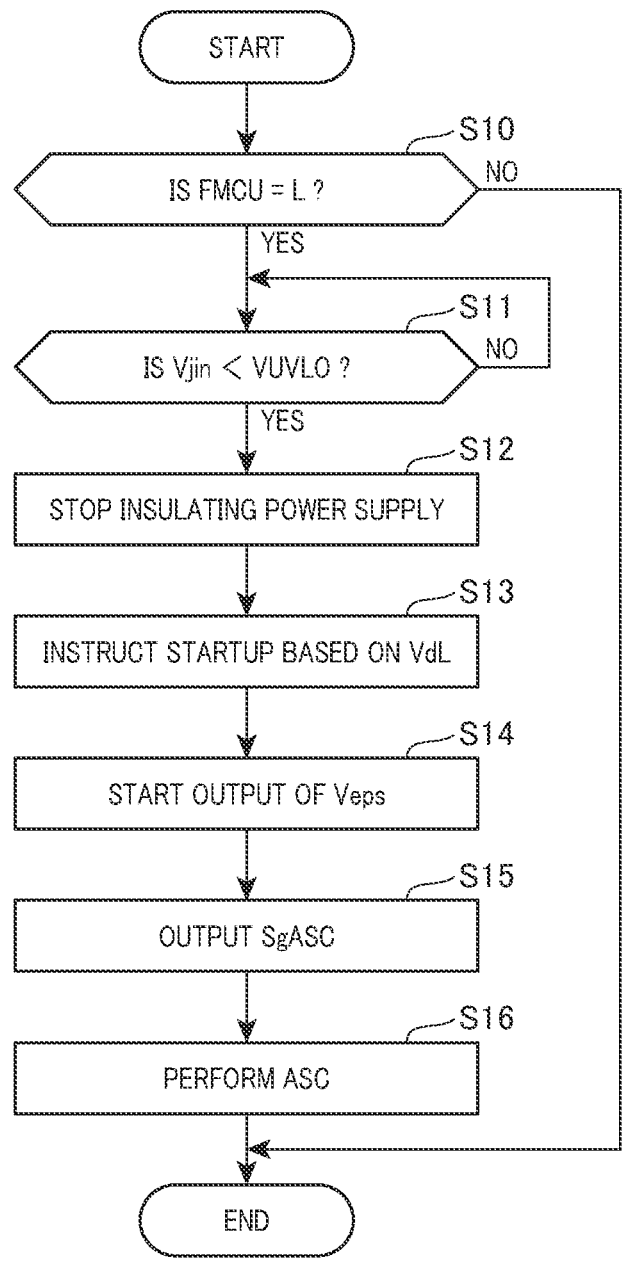

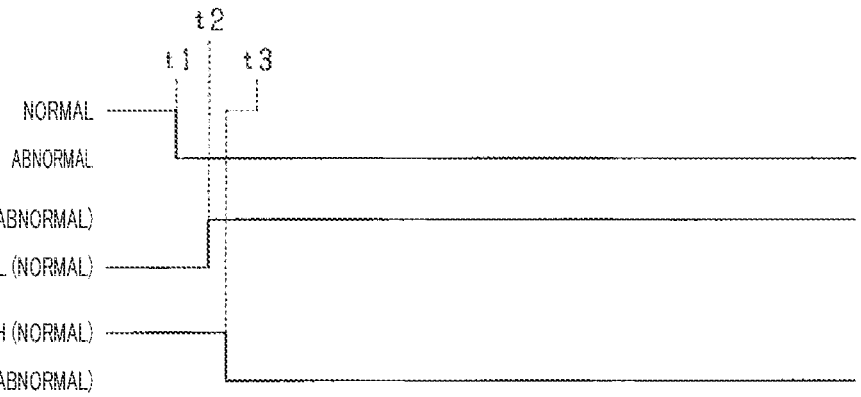

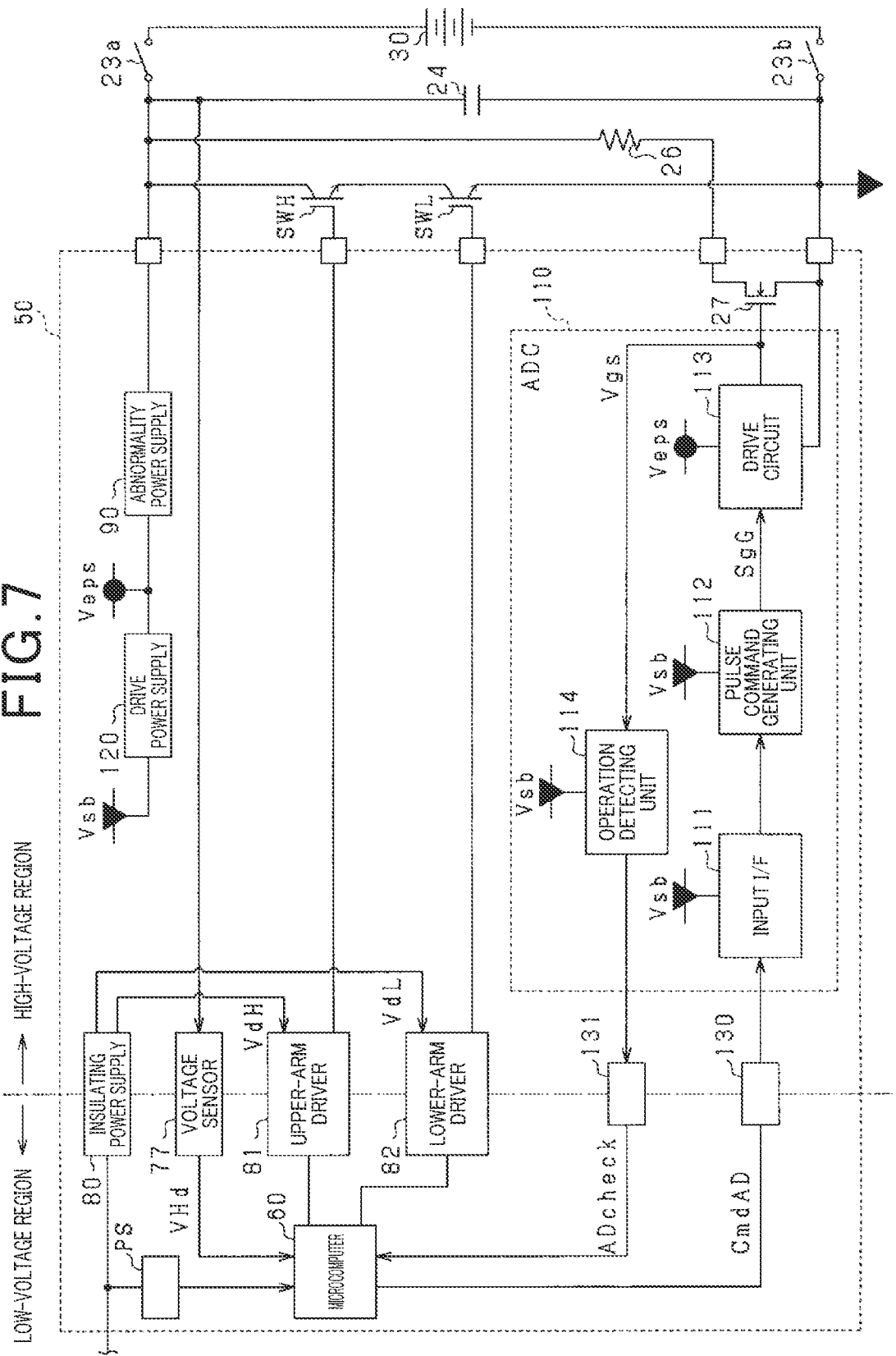

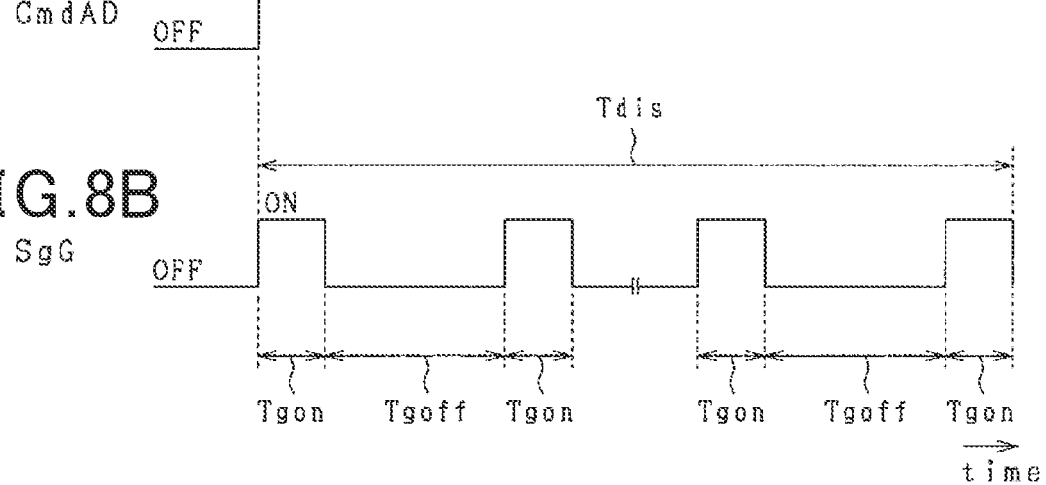

VB

VHin

LOW-VOLTAGE
POWER SUPPLY CIRCUIT

MICROCOMPUTER

VdH, VdL

Veps

FIG.18

CONTROL CIRCUIT FOR POWER CONVERTER

CROSS-REFERENCE TO RELATED APPLICATIONS

The present application is a continuation application of International Application No. PCT/JP2021/003041, filed on Jan. 28, 2021, which claims priority to Japanese Patent Application No. 2020-022527, filed on Feb. 13, 2020. The contents of these applications are incorporated herein by reference in their entirety.

BACKGROUND

Technical Field

The present disclosure relates to a control circuit for a power converter.

Related Art

As this type of control circuit, a control circuit that configures a system that includes an interruption switch that is provided on an electrical path that connects a power supply and a power converter, and a smoothing capacitor that is connected on a side opposite the power supply from the interruption switch on the electrical path is known. This system further includes a series-connection body made of a discharge resistor and a discharge switch that is connected in parallel to the smoothing capacitor.

SUMMARY

One aspect of the present disclosure provides a control circuit for a power converter that is applicable to a system that includes a power supply, a power converter, an interruption switch that is provided on an electrical path that connects the power supply and the power converter, a smoothing capacitor that is connected on a side opposite the power supply from the interruption switch on the electrical path, and a series-connection body made of a discharge resistor and a discharge switch that is connected in parallel to the smoothing capacitor. The control circuit includes a discharge command unit, a discharge drive command unit, a drive circuit, an operation detecting unit, and a discharge determining unit. The discharge command unit outputs a discharge command for the smoothing capacitor. The discharge drive command unit that outputs a drive command for the discharge switch based on the discharge command outputted from the discharge command unit. The drive circuit is connected to a gate of the discharge switch and performs drive control of the discharge switch based on the drive command outputted from the discharge drive command unit. The operation detecting unit detects a signal that is related to driving of the drive switch. The discharge determining unit determines whether the discharge drive command unit is normal based on a detected signal of the operation detecting unit.

BRIEF DESCRIPTION OF THE DRAWINGS

In the accompanying drawings:

FIG. 5 is a flowchart illustrating processing steps in three-phase short-circuit control performed based on a high-voltage-side ASC command;

FIGS. 6A to 6I are timing charts illustrating an example of the three-phase short-circuit control performed based on the high-voltage-side ASC command;

FIG. 7 is a diagram illustrating a discharge processing unit and peripheral configurations thereof;

FIGS. 8A and 8B are timing charts illustrating an example of transitions in a discharge command and a drive command;

FIGS. 17A to 17F are timing charts illustrating startup mode of an abnormality power supply and the like;

FIG. 18 is a diagram illustrating a control circuit according to a sixth embodiment and peripheral configurations thereof.

DESCRIPTION OF THE EMBODIMENTS

Figure 1:
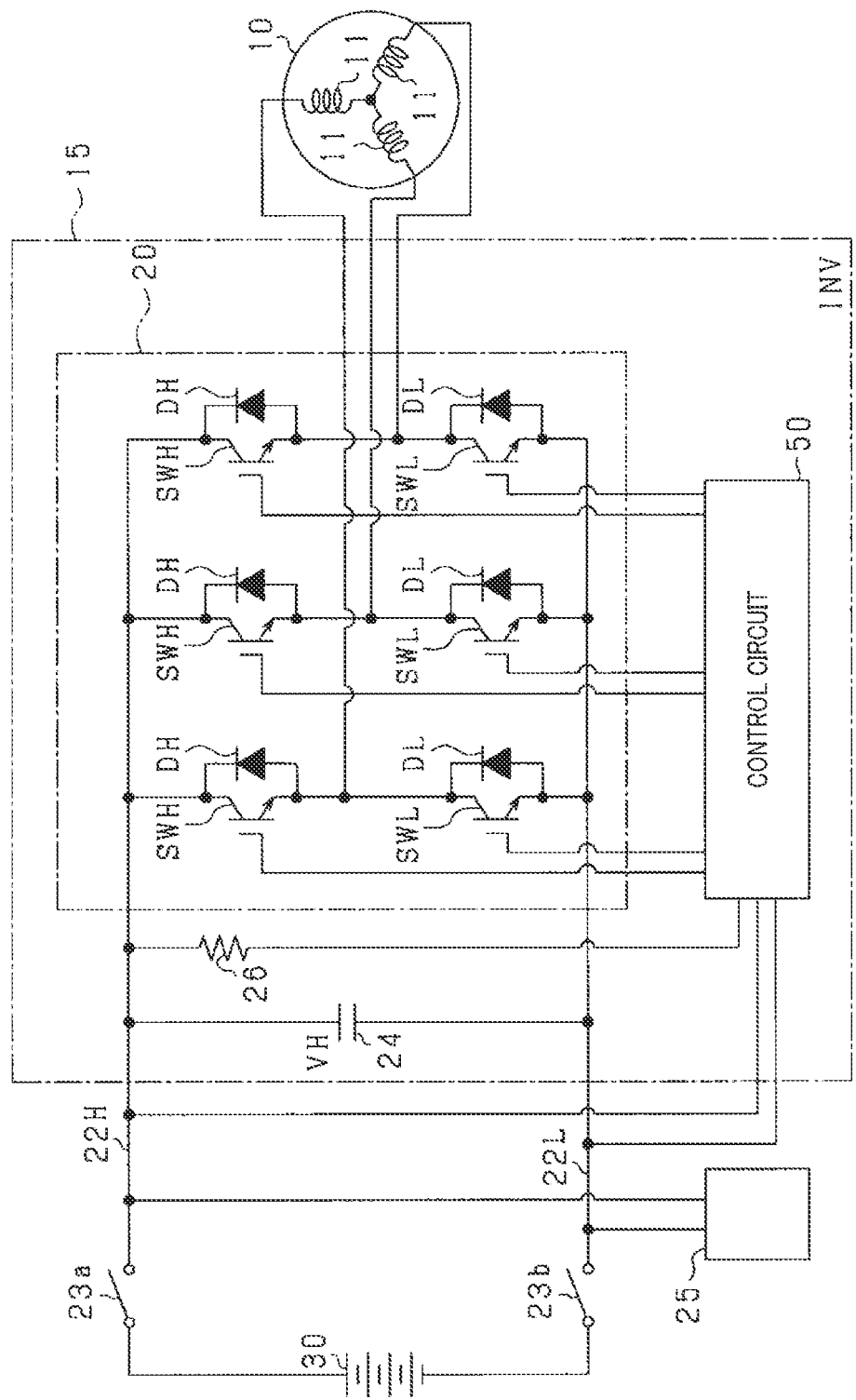
FIG. 1 is an overall configuration diagram illustrating a control system according to a first embodiment.

For example, as described in JP-A-2006-042459, as this type of control circuit, a control circuit that configures a system that includes an interruption switch that is provided on an electrical path that connects a power supply and a power converter, and a smoothing capacitor that is connected on a side opposite the power supply from the interruption switch on the electrical path is known. This system further includes a series-connection body made of a discharge resistor and a discharge switch that is connected in parallel to the smoothing capacitor.

The control circuit includes a discharge command unit that outputs a discharge command for the smoothing capacitor and a discharge drive command unit that outputs a drive command for the discharge switch based on the discharge command that is outputted from the discharge command unit. In addition, the control circuit includes a drive circuit that is connected to a gate of the discharge switch and performs drive control of the discharge switch based on the drive command that is outputted from the discharge drive command unit. As a result, discharge of the smoothing capacitor can be performed by the discharge switch being drive-controlled in a state in which the interruption switch is set to an off-state.

Here, if an abnormality occurs in the discharge drive command unit, the drive control of the discharge switch may not be able to be appropriately performed. In this case, discharge of the smoothing capacitor may not be able to be performed.

It is thus desired to provide a control circuit for a power converter that is capable of determining whether a discharge drive command unit is normal.

An exemplary embodiment to the present disclosure provides a control circuit for a power converter that is applicable to a system that includes a power supply, a power converter, an interruption switch that is provided on an electrical path that connects the power supply and the power converter, a smoothing capacitor that is connected on a side opposite the power supply from the interruption switch on the electrical path, and a series-connection body made of a discharge resistor and a discharge switch that is connected in parallel to the smoothing capacitor, the control circuit including: a discharge command unit that outputs a discharge command for the smoothing capacitor; a discharge drive command unit that outputs a drive command for the discharge switch based on the discharge command that is outputted from the discharge command unit; a drive circuit that is connected to a gate of the discharge switch and performs drive control of the discharge switch based on the drive command that is outputted from the discharge drive command unit; an operation detecting unit that detects a signal that is related to driving of the drive switch; and a discharge determining unit that determines whether the discharge drive command unit is normal based on a detected signal of the operation detecting unit.

As a result of the exemplary embodiment, whether the discharge drive command unit is normal can be appropriately determined based on the signal that is related to driving of the drive switch detected by the operation detecting unit.

Here, for example, the exemplary embodiment may be implemented in the following manner. The operation detecting unit detects a gate voltage of the discharge switch as the signal that is related to driving of the drive switch, and the discharge determining unit determines whether the discharge drive command unit and the drive circuit are normal based on the gate voltage that is detected by the operation detecting unit.

A signal flows to the discharge drive command unit, the drive circuit, and the gate of the discharge switch in this order. Therefore, the gate voltage of the discharge switch that is on a most downstream side of a signal flow path among the discharge drive command unit, the drive circuit, and the discharge switch is useful information for determining whether the discharge drive command unit and the drive circuit are normal. Consequently, whether the drive circuit, in addition to the discharge drive command unit, is normal can be determined based on the detected gate voltage of the discharge switch.

In addition, the exemplary embodiment may be implemented in the following manner. The operation detecting unit detects the drive command that is outputted from the discharge drive command unit as the signal that is related to driving of the discharge switch.

The drive command that is outputted from the discharge drive command unit may change depending on whether the discharge drive command unit is normal. Therefore, the drive command that is outputted from the discharge drive command unit is useful information for determining whether the discharge drive command unit is normal. Consequently, whether the discharge drive command unit is normal can be determined based on the detected drive command.

Furthermore, the exemplary embodiment may be implemented in the following manner. The operation detecting unit detects a voltage at a connection point between the discharge resistor and the discharge switch as the signal that is related to driving of the discharge switch, and the discharge determining unit determines whether the discharge drive command unit and the drive circuit are normal based on the voltage that is detected by the operation detecting unit.

A signal flows to the discharge drive command unit, the drive circuit, and the gate of the discharge switch in this order. As a result, drive control of the discharge switch is performed, and discharge of the smoothing capacitor is performed. In this case, the voltage at the connection point between the discharge resistor and the discharge switch changes between when the discharge switch is set to the on-state and when the discharge switch is set to the off-state. Therefore, the voltage is useful information for determining whether the discharge drive command unit and the drive circuit are normal. Consequently, whether the drive circuit, in addition to the discharge drive command unit, is normal can be determined based on a voltage detection value of the connection point between the discharge resistor and the discharge switch.

The present disclosure will be further clarified through the detailed description below, with reference to the accompanying drawings.

First Embodiment

A first embodiment actualizing a control circuit of the present disclosure will hereinafter be described with reference to the drawings. The control circuit according to the present embodiment is applicable to a three-phase inverter that serves as a power converter. According to the present embodiment, a control system that includes the inverter is mounted in a vehicle, such as an electric automobile or a hybrid car.

As shown in FIG. 1, the control system includes a rotating electric machine 10 and an inverter 15. The rotating electric machine 10 is an onboard main machine, and a rotor thereof is capable of transferring power to and from a drive wheel (not shown). According to the present embodiment, a synchronous motor is used as the rotating electric machine 10. More specifically, a permanent-magnet synchronous motor is used.

The inverter 15 includes a switching device unit 20. The switching device unit 20 includes series-connection bodies made of upper-arm switches SWH and lower-arm switches SWL for three phases. For each phase, a first end of a winding 11 of the rotating electric machine 10 is connected to a connection point between the upper- and lower-arm switches SWH and SWL. Second ends of the phase windings 11 are connected at a neutral point. The phase windings 11 are arranged such as to be shifted from each other by an electric angle of 120°. Here, according to the present embodiment, a voltage-controlled-type semiconductor switch is used as each of the switches SWH and SWL. More specifically, an insulated-gate bipolar transistor (IGBT) is used. Upper- and lower-arm diodes DH and DL that are freewheeling diodes are connected in reverse parallel to the upper- and lower-arm switches SWH and SWL.

A positive-electrode terminal of a high-voltage power supply 30 is connected to a collector that is a high-potentialside terminal of the upper-arm switch SWH by a high-potential-side electrical path 22H. A negative-electrode terminal of the high-voltage power supply 30 is connected to an emitter that is a low-potential-side terminal of the lower-arm switch SWL by a low-potential-side electrical path 22L. According to the present embodiment, the high-voltage power supply 30 is a secondary battery. An output voltage (rated voltage) of the high-voltage power supply 30 may be, for example, 100 V or higher.

A first interruption switch 23a is provided on the high-potential-side electrical path 22H, and a second interruption switch 23b is provided on the low-potential-side electrical path 22L. For example, the switches 23a and 23b may be relays or semiconductor switching elements. Here, the switches 23a and 23b may be driven by a control circuit 50 or may be driven by a high-order electronic control unit (ECU) (not shown). The high-order ECU is a control apparatus of a higher order than the control circuit 50.

The inverter 15 includes a smoothing capacitor 24. The smoothing capacitor 24 electrically connects the high-potential-side electrical path 22H further towards the switching device unit 20 side than the first interruption switch 23a and the low-potential-side electrical path 22L further towards the switching device unit 20 side than the second interruption switch 23a.

The control system includes an onboard electrical apparatus 25. For example, the electrical apparatus 25 may include at least either of an electric compressor and a direct current-to-direct current (DCDC) converter. The electric compressor configures an in-cabin air-conditioning apparatus and is driven by being supplied electric power from the high-voltage power supply 30 to circulate a coolant in an onboard refrigeration cycle. The DCDC converter steps down the output voltage of the high-voltage power supply 30 and supplies the stepped-down voltage to an onboard low-voltage load. The low-voltage load includes a low-voltage power supply 31 shown in FIG. 2. According to the present embodiment, the low-voltage power supply 31 is a secondary battery of which an output voltage (rated voltage) is a voltage (such as 12 V) that is lower than the output voltage (rated voltage) of the high-voltage power supply 30. For example, the low-voltage power supply 31 may be a lead storage battery.

The inverter 15 includes a discharge resistor 26 and a discharge switch 27. The discharge resistor 26 and the discharge switch 27 are connected in series. This series-connection body electrically connects the high-potential-side electrical path 22H further towards the switching device unit 20 side than the first interruption switch 23a and the low-potential-side electrical path 22L further towards the switching device unit 20 side than the second interruption switch 23a. Specifically, a drain that is a high-potential-side terminal of the discharge switch 27 is connected to one end of the discharge resistor 26 and a source that is a low-potential-side terminal of the discharge switch 27 is connected to the low-potential-side electrical path 22L. The discharge switch 27 is driven based on an instruction from the control circuit 50 that is provided in the inverter 15. Here, in FIG. 1, the discharge switch 27 is shown outside the control circuit 50. However, according to the present embodiment, the discharge switch 27 is provided in the control circuit 50.

Next, a configuration of the control circuit 50 will be described with reference to FIG. 2. The control circuit 50 includes an input circuit 61, an intermediate power supply circuit 62, and first to fifth low-voltage power supply circuits 63 to 67. A positive-electrode terminal of the low-voltage power supply 31 is connected to the input circuit 61 with a fuse 32 and a power supply switch 33 therebetween. A ground that serves as a grounding portion is connected to a negative-electrode terminal of the low-voltage power supply 31.

The control system includes an angle sensor 41. The angle sensor 41 outputs an angle signal based on an electrical angle of the rotating electric machine 10. For example, the angle sensor 41 may be a resolver, an encoder, or a magnetoresistive (MR) sensor that has a magneto-resistance effect element. According to the present embodiment, the angle sensor 41 is a resolver.

The intermediate power supply circuit 62 generates an intermediate voltage Vm (such as 6 V) by stepping down an output voltage VB of the input circuit 61. The first low-voltage power supply circuit 63 generates a first voltage V1r (such as 5 V) by stepping down the output voltage Vm of the intermediate power supply circuit 62. The second low-voltage power supply circuit 64 generates a second voltage V2r (such as 3.3 V) by stepping down the first voltage V1r that is outputted from the first low-voltage power supply circuit 63. The third low-voltage power supply circuit 65 generates a third voltage V3r by stepping down the first voltage V1r that is outputted from the first low-voltage power supply circuit 63. According to the present embodiment, the third voltage V3r is a voltage (such as 1.2 V) that is lower than the second voltage V2r.

The fourth low-voltage power supply circuit 66 generates a fourth voltage V4r (such as 5 V) by stepping down the output voltage VB of the input circuit 61. According to the present embodiment, the fourth voltage V4r is the same value as the first voltage V1r. The fifth low-voltage power supply circuit 67 generates a fifth voltage V5r (such as 30 V) by stepping up the output voltage VB of the input circuit 61. The input circuit 61, the power supply circuits 62 to 67, and a microcomputer 60 are provided in a low-voltage region of the control circuit 50.

The control circuit 50 includes an excitation circuit 71, an FB interface unit 72, and a resolver digital converter 73. The excitation circuit 71 is configured to be capable of operating by being supplied the fifth voltage V5r of the fifth low-voltage power supply circuit 67. The excitation circuit 71 supplies a sine-wave excitation signal to a resolver stator that configures the angle sensor 41. The angle signal that is outputted from the resolver stator is inputted to the resolver digital converter 73 through the FB interface unit 72. The FB interface unit 72 and the resolver digital converter 73 are configured to be capable of operating by being supplied the first voltage V1r of the first low-voltage power supply circuit 63. The resolver digital converter 73 calculates the electrical angle of the rotating electric machine 10 based on the angle signal from the FB interface unit 72. The calculated electrical angle is inputted to the microcomputer 60. The microcomputer 60 calculates an electrical angular velocity of the rotating electric machine 10 based on the inputted electrical angle.

Here, the excitation circuit 71, the FB interface unit 72, and the resolver digital converter 73 are provided in the low-voltage region of the control circuit 50.

The microcomputer 60 includes a central processing unit (CPU) and other peripheral circuits. For example, the peripheral circuits may include an input/output unit for exchanging signals with the outside and an analog-to-digital (AD) converting unit. The first voltage V1r of the first low-voltage power supply circuit 63, the second voltage V2r of the second low-voltage power supply circuit 64, and the third voltage V3r of the third low-voltage power supply circuit 65 are supplied to the microcomputer 60.

The control circuit 50 includes a voltage sensor 77, an overvoltage detecting unit 78, and a state determining unit 79. The voltage sensor 77 is electrically connected to the high-potential-side electrical path 22H and the low-potential-side electrical path 22L, and is configured to be capable of operating by being supplied the output voltage VB of the input circuit 61 and the fifth voltage V5r of the fifth low-voltage power supply circuit 67. The voltage sensor 77 detects a terminal voltage of the smoothing capacitor 24. A detection value of the voltage sensor 77 is inputted to the microcomputer 60 and the overvoltage detecting unit 78.

The overvoltage detecting unit 78 is configured to be capable of operating by being supplied the first voltage V1r of the first low-voltage power supply circuit 63. The overvoltage detecting unit 78 determines whether a terminal voltage VHd of the smoothing capacitor 24 that is detected by the voltage sensor 77 exceeds an upper-limit voltage thereof. When determined that the terminal voltage exceeds the upper-limit voltage, the overvoltage detecting unit 78 outputs an overvoltage signal to the microcomputer 60 and the state determining unit 79.

The state determining unit 79 is configured to be capable of operating by being supplied the first voltage V1r of the first low-voltage power supply circuit 63. In addition, according to the present embodiment, the state determining unit 79 is configured by a logic circuit. The voltage sensor 77, the overvoltage detecting unit 78, and the state determining unit 79 are provided in the low-voltage region of the control circuit 50.

The control system includes a starting switch 28. For example, the starting switch 28 may be an ignition switch or a push-type start switch, and is operated by a user of the vehicle. The high-order ECU switches the power supply switch 33 to an on-state when determined that the starting switch 28 is switched to the on-state. As a result, power supply from the low-voltage power supply 31 to the control circuit 50 is started. Meanwhile, the high-order ECU switches the power supply switch 33 to an off-state when determined that the starting switch 28 is switched to the off-state. Specifically, when determined that the starting switch 28 is switched to the off-state, the high-order ECU switches the power supply switch 33 to the off-state after a predetermined end sequence process. As a result, power supply from the low-voltage power supply 31 to the control circuit 50 is stopped.

The microcomputer 60 generates switching commands for the switches SWH and SWL of the switching device unit 20 to control a controlled variable of the rotating electric machine 10 to a command value thereof. For example, the controlled variable may be torque. The microcomputer 60 generates the switching command based on an output signal of the angle sensor 41 and the like. The switching command is either of an on-command that instructs on-driving of the switch and an off-command that instructs off-driving of the switch. Here, the microcomputer 60 generates the switching commands such that the upper-arm switch SWH and the lower-arm switch SWL are alternately set to the on-state in each phase. In addition, according to the present embodiment, the microcomputer 60 includes a "switch command generating unit."

The control circuit 50 includes an insulating power supply 80, an upper-arm driver 81, and a lower-arm driver 82. According to the present embodiment, the upper-arm driver 81 is individually provided in correspondence with each upper-arm switch SWH. The lower-arm driver 82 is individually provided in correspondence with each lower-arm switch SWL. Therefore, a total of six drivers 81 and 82 are provided.

The insulating power supply 80 generates and outputs an upper-arm drive voltage VdH that is supplied to the upper-arm drivers 81 and a lower-arm drive voltage VdL that is supplied to the lower-arm drivers 82 based on the voltage that is supplied from the input circuit 61. The insulating power supply 80 and the drivers 81 and 82 are provided in the low-voltage region and a high-voltage region of the control circuit 50 such as to straddle a boundary between the low-voltage region and the high-voltage region. Specifically, the insulating power supply 80 includes an upper-arm insulating power supply that is individually provided for each of the upper-arm drivers 81 of the three phases, and a lower-arm insulating power supply that is shared among the lower-arm drivers 82 of the three phases. According to the present embodiment, the upper-arm insulating power supplies and the lower-arm insulating power supply are controlled by a common power supply control unit. Here, the lower-arm insulating power supply may be individually provided for each of the lower-arm drivers 82 of the three phases.

Figure 3:
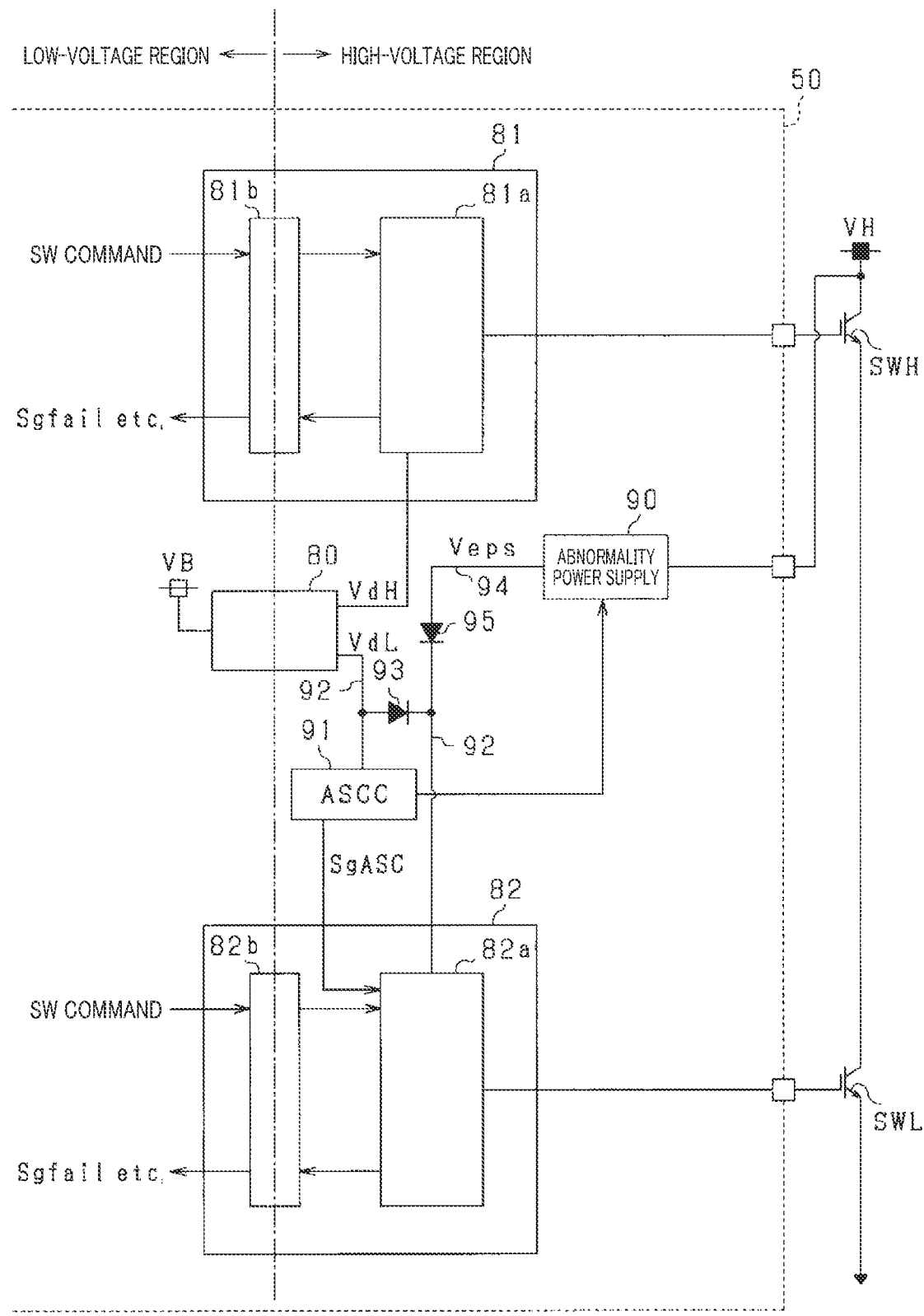
FIG. 3 is a diagram illustrating upper- and lower-arm drivers and peripheral configurations thereof.

Next, the upper- and lower-arm drivers 81 and 82 will be described with reference to FIG. 3.

The upper-arm driver 81 includes an upper-arm drive unit 81*a* that serves as a "switch drive unit" and an upper-arm insulating transmitting unit 81*b*. The upper-arm drive unit 81*a* is provided in the high-voltage region. The upper-arm insulating transmitting unit 81*b* is provided in the low-voltage region and the high-voltage region such as to straddle the boundary between the low-voltage region and the high-voltage region. The upper-arm insulating transmitting unit 81*b* transmits the switching command that is outputted from the microcomputer 60 to the upper-arm drive unit 81*a* while electrically insulating between the low-voltage region and the high-voltage region. For example, the upper-arm insulating transmitting unit 81*b* may be a photocoupler or a magnetic coupler.

Of the upper-arm driver 81, the configuration on the high-voltage region side of the upper-arm drive unit 81*a* and the upper-arm insulating transmitting unit 81*b* and the like are configured to be capable of operating by being supplied the upper-arm drive voltage VdH of the insulating power supply 80. Of the upper-arm driver 81, the configuration on the low-voltage region area side of the upper-arm insulating transmitting unit 81*b* and the like are configured to be capable of operating by being supplied the first voltage V1r of the first low-voltage power supply circuit 63.

The upper-arm drive unit 81*a* supplies a charge current to a gate of the upper-arm switch SWH when the inputted switching command is the on-command. As a result, a gate voltage of the upper-arm switch SWH is equal to or greater than a threshold voltage Vth, and the upper-arm switch SWH is set to the on-state. Meanwhile, when the inputted switching command is the off-command, the upper-arm drive unit 81*a* sends a discharge current from the gate of the upper-arm switch SWH to an emitter side. As a result, the gate voltage of the upper-arm switch SWH is less than the threshold voltage Vth and the upper-arm switch SWH is set to the off-state.

The upper-arm drive unit 81*a* transmits, to the microcomputer 60 through the upper-arm insulating transmitting unit 81*b*, a fail signal Sgfail that is information indicating that an abnormality has occurred in at least either of the upper-arm drive unit 81*a* itself and the upper-arm switch SWH, and information on a temperature Tswd of the upper-arm switch SWH. Abnormality in the upper-arm switch SWH includes at least one of overheating abnormality, overvoltage abnormality, and overcurrent abnormality.

The lower-arm driver 82 includes a lower-arm drive unit 82a that serves as a "switch drive unit" and a lower-arm insulating transmitting unit 82b. According to the present embodiment, configurations of the drivers 81 and 82 are basically identical. Therefore, hereafter, a detailed description of the lower-arm driver 82 is omitted as appropriate.

Of the lower-arm driver 82, a configuration on the high-voltage region side of the lower-arm drive unit 82a and the lower-arm insulating transmitting unit 82b and the like are configured to be capable of operating by being supplied the lower-arm drive voltage VdL of the insulating power supply 80. Of the lower-arm driver 82, a configuration on the low-voltage region side of the lower-arm insulating transmitting unit 82b and the like are configured to be capable of operating by being supplied the first voltage V1r of the first low-voltage power supply circuit 63.

The lower-arm drive unit 82a supplies a charge current to a gate of the lower-arm switch SWL when the inputted switching command is the on-command. As a result, a gate voltage of the lower-arm switch SWL is equal to or greater than the threshold voltage Vth, and the lower-arm switch SWL is set to the on-state. Meanwhile, when the inputted switching command is the off-command, the lower-arm drive unit 82a sends a discharge current from the gate of the lower-arm switch SWL to the emitter side. As a result, the gate voltage of the lower-arm switch SWL is less than the threshold voltage Vth and the lower-arm switch SWL is set to the off-state.

The lower-arm drive unit 82a transmits, to the microcomputer 60 through the lower-arm insulating transmitting unit 82b, the fail signal Sgfail that is information indicating that an abnormality has occurred in at least either of the lower-arm drive unit 82a itself and the lower-arm switches SWL, and information on the temperature Tswd of the lower-arm switches SWL. Abnormality in the lower-arm switch SWL include at least one of overheating abnormality, overvoltage abnormality, and overcurrent abnormality.

Figure 2:
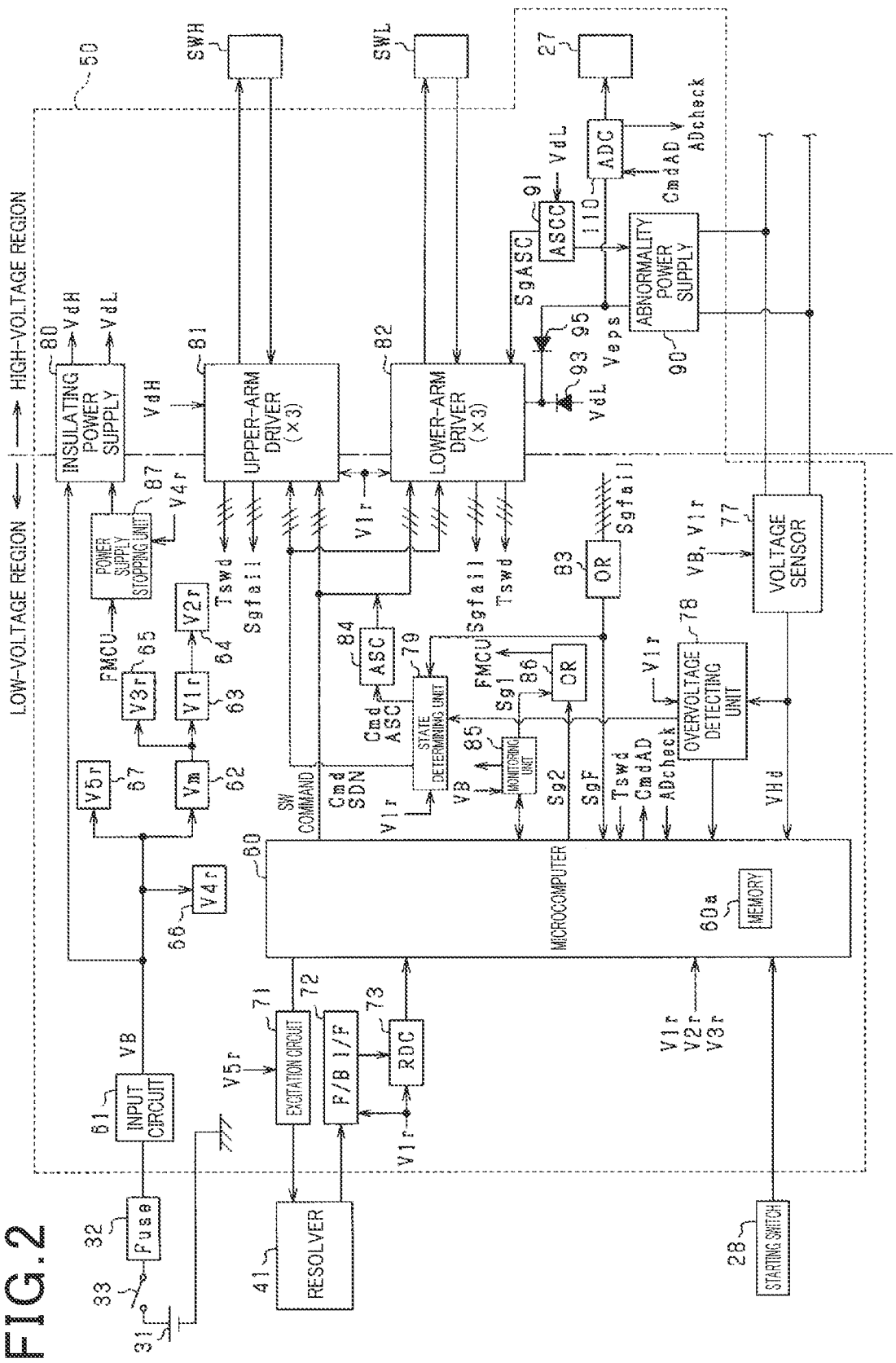
FIG. 2 is a diagram illustrating a control circuit and peripheral configurations thereof.

Returning to the description of FIG. 2, the control circuit 50 includes a fail detecting unit 83. The fail detecting unit 83 is provided in the low-voltage region and the fail signals Sgfail from the drivers 81 and 82 are inputted thereto. According to the present embodiment, when the fail signal Sgfail is inputted from any of the drivers 81 and 82, the fail detecting unit 83 outputs an abnormality signal SgF that has logic H to the microcomputer 60 and the state determining unit 79. Meanwhile, when the fail signal Sgfail is not inputted from any of the drivers 81 and 82, the fail detecting unit 83 outputs the abnormality signal SgF that has logic L to the microcomputer 60 and the state determining unit 79.

The control circuit 50 includes a low-voltage-side ASC command unit 84, a monitoring unit 85, an OR circuit 86, and a power supply stopping unit 87 that serves as an "abnormality determining unit." The low-voltage-side ASC command unit 84, the monitoring unit 85, the OR circuit 86, and the power supply stopping unit 87 are provided in the low-voltage region. The monitoring unit 85 is configured to be capable of operating by being supplied the output voltage VB of the input circuit 61. The power supply stopping unit 87 is configured to be capable of operating by being supplied the fourth voltage V4r of the fourth low-voltage power supply circuit 66.

When a low-voltage-side ASC command CmdASC is inputted from the state determining unit 79, the low-voltage-side ASC command unit 84 forcibly sets the switching command that is inputted to the lower-arm drivers 82 of the three phases to the on-command regardless of the switching command that is outputted from the microcomputer 60.

A configuration of the high-voltage region of the control circuit 50 will be described with reference to FIGS. 2 and 3.

The control circuit 50 includes an abnormality power supply (a power supply used for abnormality, e.g., a backup power supply) 90 and a high-voltage-side ASC command unit 91 that serves as an "abnormality control unit." The abnormality power supply 90 generates an abnormality drive voltage Veps by being supplied an output voltage VH of the smoothing capacitor 24. Various power supplies can be used as the abnormality power supply 90. For example, a switching power supply can be used. A high-potential side of the smoothing capacitor 24 is connected to an input side of the abnormality power supply 90. The abnormality drive voltage Veps that is outputted from an output side of the abnormality power supply 90 is controlled to a target voltage thereof.

The control circuit 50 includes a normal power supply path 92, a normal diode 93, an abnormality power supply path 94, and an abnormality diode 95. The normal power supply path 92 connects an output side of the insulating power supply 80 and the lower-arm drive unit 82a, and supplies the lower-arm drive voltage VdL to the lower-arm drive unit 82a. The normal diode 93 is provided in an intermediate position on the normal power supply path 92 in a state in which an anode is connected to the output side of the insulating power supply 80.

Of the normal power supply path 92, a portion further towards the lower-arm drive unit 82a side than the normal diode 93 and a portion on an output side of the abnormality power supply 90 are connected by the abnormality power supply path 94. The abnormality diode 95 is provided in the abnormality power supply path 94 in a state in which an anode is connected to the output side of the abnormality power supply 90. The abnormality power supply path 94 supplies the abnormality drive voltage Veps to the lower-arm drive unit 82a.

The lower-arm drive voltage VdL of the insulating power supply 80 is supplied to the high-voltage-side ASC command unit 91 through the normal power supply path 92. The high-voltage-side ASC command unit 91 outputs a high-voltage-side ASC command SgASC to the lower-arm drive unit 82a.

Next, the OR circuit 86, the power supply stopping unit 87, and peripheral configurations thereof will be described with reference to FIG. 4. The OR circuit 86 includes first to fourth resistors 86a to 86d and first and second switches 86e and 86f. The microcomputer 60 and a first end of the second resistor 86b are connected to a first end of the first resistor 86a. A second end of the second resistor 86b is connected to the ground. The monitoring unit 85 is connected to a second end of the first resistor 86a with the third resistor 86c therebetween.

The fourth low-voltage power supply circuit 66 is connected to a first end of the fourth resistor 86d and the ground is connected to a second end of the fourth resistor 86d with the first switch 86e therebetween. A first determination signal Sg1 from the monitoring unit 85 is supplied to a base of the first switch 86e. The ground is connected to the second end of the first resistor 86a with the second switch 86f therebetween. A connection point between the fourth resistor 86d and the first switch 86e is connected to a base of the second switch 86f.

The microcomputer 60 provides a self-monitoring function. The microcomputer 60 sets a logic of a second determination signal Sg2 to H when determined that an abnormality has not occurred in the microcomputer 60 itself. In this case, a logic of an abnormality notification signal FMCU that is an output signal of the OR circuit 86 is H. Meanwhile, the microcomputer 60 sets the logic of the second determination signal Sg2 to L when determined that an abnormality has occurred in the microcomputer 60 itself. In this case, the logic of the abnormality notification signal FMCU is L.

The monitoring unit 85 provides a function for monitoring whether an abnormality has occurred in the microcomputer 60. For example, the monitoring unit 85 may be configured by a watchdog counter (WDC) or a function watchdog counter (F-WDC). When determined that an abnormality has not occurred in the microcomputer 60, the monitoring unit 85 sets the logic of the first determination signal Sg1 to L. In this case, the first and second switches 86e and 86f are maintained in the off-state, and the logic of the abnormality notification signal FMCU is set to H. Meanwhile, when determined that an abnormality has occurred in the microcomputer 60, the monitoring unit 85 sets the logic of the first determination signal Sg1 to H. In this case, the first and second switches 86e and 86f are switched to the on-state, and the logic of the abnormality notification signal FMCU is set to L.

The abnormality notification signal FMCU is inputted to the power supply stopping unit 87. The power supply stopping unit 87 includes an abnormality detection circuit 87a and a switching switch 87b. The ground is connected to a first end of the switching switch 87b, and a connection point between first and second voltage dividing resistors 96a and 96b that are provided in the control circuit 50 is connected to a second end of the switching switch 87b. The input circuit 61 is connected to a first end of a series-connection body made of the first and second voltage dividing resistors 96a and 96b, and the ground is connected to a second end of the series-connection body. An under-voltage lockout (UVLO) terminal of the insulating power supply 80 is connected to the connection point between the first and second voltage dividing resistors 96a and 96b. When determined that a determination voltage Vjin that is a voltage that is inputted to this connection point falls below a low-voltage threshold VUVLO, a control unit of the insulating power supply 80 performs a low-voltage erroneous operation prevention process in which the insulating power supply 80 is stopped. Meanwhile, when determined that the inputted determination voltage Vjin exceeds a cancel threshold (<VB) that is higher than the low-voltage threshold VUVLO, the control unit of the insulating power supply 80 stops the low-voltage erroneous operation prevention process and resumes operation of the insulating power supply 80.

The abnormality detection circuit 87a is configured to be capable of operating by being supplied the fourth voltage V4r of the fourth low-voltage power supply circuit 66. When determined that the logic of the abnormality notification signal FMCU is H, the abnormality detection circuit 87a sets the switching switch 87b to the off-state. In this case, the determination voltage Vjin is equal to or greater than the low-voltage threshold VUVLO. Meanwhile, when determined that the logic of the abnormality notification signal FMCU is L, the abnormality detection circuit 87a sets the switching switch 87b to the on-state. In this case, the determination voltage Vjin is less than the low-voltage threshold VUVLO and the low-voltage erroneous operation prevention process is performed. When this process is performed, the insulating power supply 80 is stopped, and the upper-arm drive voltage VdH and the lower-arm drive voltage VdL start to gradually decrease towards 0 V.

According to the present embodiment, even if an abnormality within the control circuit 50 that would conventionally result in a shutdown state occurs, three-phase short-circuit control (active short circuit [ASC]) can be performed. The shutdown state is when the upper- and lower-arm switches SWH and SWL of the three phases are set to the off-state. Here, the abnormality within the control circuit 50 includes an abnormality in the microcomputer 60, an abnormality in at least one of the intermediate power supply circuit 62 and the first to third low-voltage power supply circuits 63 to 65, an abnormality in which the switching command cannot be normally transmitted from the microcomputer 60 to the upper- and lower-arm drivers 81 and 82, and an abnormality in which the voltage cannot be outputted from the insulating power supply 80.

Here, the abnormality in which the voltage cannot be outputted from the insulating power supply 80 includes an abnormality in the insulating power supply 80 and an abnormality in which electric power cannot be supplied from the low-voltage power supply 31 to the insulating power supply 80. Here, for example, the abnormality in which electric power cannot be supplied from the low-voltage power supply 31 to the insulating power supply 80 may occur as a result of an electrical path, such as the input circuit 61, from the low-voltage power supply 31 to the insulating power supply 80 being disconnected. In addition, when described with the lower-arm driver 82 as an example, the abnormality in which the switching command cannot be normally transmitted includes an abnormality in which a signal path from the microcomputer 60 to the lower-arm insulating transmitting unit 82b is disconnected. Here, for example, the above-described abnormalities may occur as a result of collision of the vehicle.

The three-phase short-circuit control that is performed when an abnormality occurs in the control circuit 50 will be described with reference to FIG. 5.

At step S10, the abnormality detection circuit 87a of the power supply stopping unit 87 determines whether the logic of the inputted abnormality notification signal FMCU is L. When the logic of the second determination signal Sg2 that is outputted from the microcomputer 60 is L or when the logic of the first determination signal Sg1 that is outputted from the monitoring unit 85 is H, the logic of the abnormality notification signal FMCU is L. The logic of the second determination signal Sg2 that is outputted from the microcomputer 60 is L even in cases in which an abnormality occurs in the intermediate power supply circuit 62 or the first to third low-voltage power supply circuits 63 to 65 that serve as power supplies for the microcomputer 60.

When determined that the logic of the abnormality notification signal FMCU is L, the abnormality detection circuit 87a switches the switching signal 87b to the on-state. As a result, the determination voltage Vjin that is inputted to the UVLO terminal of the insulating power supply 80 decreases towards 0 V that is ground potential.

At step S11, the power supply control unit of the insulating power supply 80 waits until the determination voltage Vjin falls below the low-voltage threshold VUVLO. When determined that the determination voltage Vjin is below the low-voltage threshold VUVLO, at step S12, the power supply control unit performs the low-voltage erroneous operation prevention process and stops the insulating power supply 80. As a result, the upper- and lower-arm drive voltages VdH and VdL that are outputted from the insulating power supply 80 start to decrease towards 0 V.

At step S13, the high-voltage-side ASC command unit 91 detects the lower-arm drive voltage VdL that is outputted from the insulating power supply 80 and instructs the abnormality power supply 90 to start after the detected lower-arm drive voltage VdL starts to decrease. As a result, at step S14, the abnormality drive voltage Veps starts to be outputted from the abnormality power supply 90.

Specifically, the high-voltage-side ASC command unit 91 instructs startup of the abnormality power supply 90 after a sufficient period until the upper-arm switch SWH is set to the off-state elapses after the detected lower-arm drive voltage VdL starts to decrease. This is to prevent occurrence of upper- and lower-arm short circuit.

For example, the high-voltage-side ASC command unit 91 may instruct startup of the abnormality power supply 90 when the detected lower-arm drive voltage VdL is determined to have fallen below a predetermined voltage Vp after the detected lower-arm drive voltage VdL starts to decrease. Here, the predetermined voltage Vp may be set to a value that allows determination that a sufficient period until the upper-arm switch SWH is set to the off-state has elapsed. For example, the predetermined voltage Vp may be set to a value that is identical to the above-described threshold voltage Vth or a value that is less than the threshold voltage Vth.

In addition, for example, the high-voltage-side ASC command unit 91 may instruct startup of the abnormality power supply 90 at a timing at which a predetermined period elapses from the when the detected lower-arm drive voltage VdL starts to decrease. Here, the predetermined period may be set to a value that allows determination that a sufficient period until the upper-arm switch SWH is set to the off-state has elapsed.

Subsequently, at step S15, the high-voltage-side ASC command unit 91 outputs the high-voltage-side ASC command SgASC to the lower-arm drive unit 82a. As a result, at step S16, the lower-arm drive unit 82a turns on the lower-arm switches SWL of the three phases. That is, the three-phase short-circuit control in which the lower-arm switches SWL that serve as "on-side switches" of the three phases are set to the on-state and the upper-arm switches SWH that serve as "off-side switches" of the three phases are set to the off-state is performed.

Processes in FIG. 5 will be further described with reference to FIGS. 6A to 6I. FIG. 6A shows transitions in presence/absence of an abnormality in the microcomputer 60. FIG. 6B shows transitions in the first determination signal Sg1 that is outputted from the monitoring unit 85. FIG. 6C shows transitions in the abnormality notification signal FMCU. FIG. 6D shows transitions in an operation state of the insulating power supply 80. FIGS. 6E and 6F show transitions in the upper- and lower-arm drive voltages VdH and VdL that are outputted from the insulating power supply 80. FIG. 6G shows transitions in an operation state of the abnormality power supply 90. FIG. 6H shows transitions in the high-voltage-side ASC command SgASC that is outputted from the high-voltage-side ASC command unit 91. FIG. 6I shows transitions in a driving state of the lower-arm switch SWL of each phase.

At time t1, an abnormality in the microcomputer 60 is detected. Therefore, at time t2, the logic of the first determination signal Sg1 that is outputted from the monitoring unit 85 is inverted to H and, at time t3, the logic of the abnormality notification signal FMCU is inverted to L. As a result, the switching switch 87b is switched to the on-state, and the low-voltage erroneous operation prevention process of the insulating power supply 80 is performed. Therefore, at time t4, the insulating power supply 80 is stopped, and the upper- and lower-arm drive voltages VdH and VdL start to decrease.

After the lower-arm drive voltage VdL starts to decrease, at time t5 at which a sufficient period until the upper-arm switch SWH is set to the off-state from time t4 elapses, startup of the abnormality power supply 90 is instructed by the high-voltage-side ASC command unit 91. As a result, the abnormality drive voltage Veps starts to be outputted from the abnormality power supply 90. Here, whether the sufficient period has elapsed may be determined, for example, based on whether the detected lower-arm drive voltage VdL falls below the predetermined voltage Vp, or whether a predetermined period has elapsed from when the lower-arm drive voltage starts to decrease, as described above. Subsequently, at time t6, the high-voltage-side ASC command SgASC is outputted from the high-voltage-side ASC command unit 91 to the lower-arm drive unit 82a and, at time t7, the lower-arm switches SWL of the three phases are set to the on-state by the lower-arm drive unit 82a.

Here, even in cases in which an abnormality occurs in the low-voltage power supply 31, an abnormality occurs in the input circuit 61, the power supply path that electrically connects the low-voltage power supply 31 and the control circuit 50 becomes disconnected, or an abnormality occurs in the insulating power supply 80, the three-phase short-circuit control is performed by the processes at steps S11 to S16. That is, in this case, the insulating power supply 80 is stopped by the low-voltage erroneous operation prevention process, the upper- and lower-arm drive voltages VdH and VdL decrease towards 0 V, and the three-phase short-circuit control is performed.

In addition, even in cases in which an overvoltage abnormality occurs, the three-phase short-circuit control is performed. Specifically, the state determining unit 79 determines whether an overvoltage signal is inputted from the overvoltage detecting unit 78. When determined that an overvoltage signal is inputted, the state determining unit 79 outputs the low-voltage-side ASC command CmdASC to the low-voltage-side ASC command unit 84.

When the low-voltage-side ASC command CmdASC is inputted, the low-voltage-side ASC command unit 84 outputs a shutdown command CmdSDN that forcibly sets the switching command that is inputted to the upper-arm drivers 81 of the three phases to the off-command regardless of the switching command that is inputted from the microcomputer 60. In addition, the low-voltage-side ASC command unit 84 forcibly sets the switching command that is inputted to the lower-arm drivers 82 of the three phases to the on-command regardless of the switching command that is outputted from the microcomputer 60. As a result, the three-phase short-circuit control is performed.

The control circuit 50 includes a discharge processing unit 110. The discharge processing unit 110 is provided in the high-voltage region of the control circuit 50 and is a configuration for confirming whether discharge control of the smoothing capacitor 24 by driving of the discharge switch 27 can be performed normally. Hereafter, the discharge processing unit 110 will be described with reference to FIG. 7. Here, FIG. 7 collectively indicates the intermediate power supply circuit 62 and the first to third low-voltage power supply circuits 63 to 65 by PS. In addition, FIG. 7 shows only the upper-arm driver 81, the lower-arm driver 82, and the like of one phase.

The discharge processing unit 110 includes an input interface unit 111, a pulse command generating unit 112 that serves as a "discharge drive command unit," a drive circuit 113, and an operation detecting unit 114. The input interface unit 111, the pulse command generating unit 112, and the operation detecting unit 114 are configured to be capable of operating by being supplied a drive voltage Vsb of a drive power supply 120 that is provided in the high-voltage region of the control circuit 50. The drive power supply 120 generates the drive voltage Vsb by being supplied electric power from the abnormality power supply 90. For example, the drive power supply 120 may generate the drive voltage Vsb (such as 5 V) by stepping down the abnormality drive voltage Veps of the abnormality power supply 90.

The drive circuit 113 is configured to be operated by being supplied the abnormality drive voltage Veps of the abnormality power supply 90. Therefore, even in cases with which electric power cannot be supplied from the low-voltage power supply 31 to the control circuit 50, drive control of the discharge switch 27 can be performed.

The control circuit 50 includes an input-side insulating transmitting unit 130 and an output-side insulating transmitting unit 131. The input-side insulating transmitting unit 130 and the output-side insulating transmitting unit 131 are provided in the low-voltage region and the high-voltage region such as to straddle the boundary between the low-voltage region and the high-voltage region. The input-side insulating transmitting unit 130 transmits a discharge command CmdAD that is outputted from the microcomputer 60 to the input interface unit 111, while electrically insulating between the low-voltage region and the high-voltage region. The output-side insulating transmitting unit 131 transmits a discharge check signal ADcheck that is outputted from the operation detecting unit 114 to the microcomputer 60, while electrically insulating between the low-voltage region and the high-voltage region. For example, the input-side insulating transmitting unit 130 and the output-side insulating transmitting unit 131 may be photocouplers or magnetic couplers.

For example, a configuration on the high-voltage region side of the input-side insulating transmitting unit 130 and the output-side insulating transmitting unit 131 may be configured to be capable of operating by being supplied the lower-arm drive voltage VdL of the insulation power supply 80. For example, a configuration on the low-voltage region side of the input-side insulating transmitting unit 130 and the output-side insulating transmitting unit 131 may be configured to be capable of operating by being supplied the first voltage V1r of the first low-voltage power supply circuit 63.

The pulse command generating unit 112 generates a drive command SgG that is outputted to the drive circuit 113 based on the discharge command CmdAD that is inputted through the input interface unit 111. According to the present embodiment, as shown in FIGS. 8A and 8B, the pulse command generating unit 112 generates the drive command SgG that includes a plurality of on-pulse commands during a period in which the discharge command CmdAD is inputted. Here, the plurality of on-pulse commands are used in preparation for a case in which the discharge control of the smoothing capacitor 24 is performed in a state in which the first and second interruption switches 23a and 23b are set to the on-state regardless of the off-command being issued to the first and second interruption switches 23a and 23b. For example, this state may occur when an off-delay time from when the off-command is issued to the first and second interruption switches 23a and 23b until the first and second interruption switches 23a and 23b are switched to the off-state becomes long.

When the discharge switch 27 is in the on-state when the first and second interruption switches 23a and 23b are in the on-state, the smoothing capacitor 24 cannot be made to discharged. In addition, a direct-current current continuously flows from the high-voltage power supply 30 to the discharge resistor 26. As a result, an amount of heat generation in the discharge resistor 26 increases, and the discharge resistor 26 may malfunction. To counter this issue, the discharge resistor 26 that has a large resistance value is required. However, in this case, the discharge resistor 26 increases in size.

To counter such an issue, the drive command SgG that includes a plurality of on-pulse commands is used. As a result of the drive command SgG such as this, an off-command period can be included in the drive command SgG. As a result, even in a case in which the discharge control of the smoothing capacitor 24 is performed in a state in which the first and second interruption switches 23a and 23b are set to the on-state regardless of the off-command being issued to the first and second interruption switches 23a and 23b, the discharge resistor 26 can be maintained in as safe a state as possible while discharge request to the smoothing capacitor 24 is satisfied.

FIG. 8B shows transitions in the drive command SgG according to the present embodiment. Tgon indicates a pulse width of the on-pulse command. Tgoff indicates a time interval between adjacent on-pulse commands. In addition, Tdis is a pulse duration period Tdis and is a period from a first on-pulse command to a final on-pulse command. For example, the pulse duration period Tdis may be set based on an expected off-delay time. Specifically, the pulse duration period Tdis may be set to a value that is longer than an expected maximum value of the off-delay time. Furthermore, the pulse duration period Tdis is set to a period that is longer than a normal discharge period of the smoothing capacitor 24.

According to the present embodiment, the normal discharge period is a period (specifically, for example, an expected maximum value of this period) from when the first on-pulse command is outputted until discharge of the smoothing capacitor 24 is completed in a case in which, after the first on-pulse command is outputted from the pulse command generating unit 112, the discharge of the smoothing capacitor 24 is completed by the discharge switch 27 being set to the on-state based on the on-pulse command.

The pulse width Tgon is related to an amount of time from when the discharge command CmdAD is outputted and the discharge control of the smoothing capacitor 24 is started until the discharge of the smoothing capacitor 24 is completed, and the amount of heat generation in the discharge resistor 26. The time interval Tgoff of the on-pulse commands is related to adjustment of temperature decrease in the discharge resistor 26. For example, the pulse width Tgon and the time interval Tgoff may be set based on a capacitance of the smoothing capacitor 24, the voltage of the high-voltage power supply 30, a discharge required time, and a thermal design of the discharge resistor 26. The discharge required time is an amount of time required from start of discharge control to completion of discharge of the smoothing capacitor 24. Specifically, for example, the discharge required time may be a required value for an amount of time from the start of discharge control until the voltage of the smoothing capacitor 24 decreases and reaches a predetermined voltage.

Returning to the description of FIG. 7, the drive circuit 113 supplies a gate of the discharge switch 27 with a charge current when the inputted drive command SgG is the on-command. As a result, a gate voltage of the discharge switch 27 is equal to or greater than a threshold voltage thereof, and the discharge switch 27 is set to the on-state. Meanwhile, when the inputted drive command SgG is the off-command, the drive circuit 113 sends a discharge current from the gate of the discharge switch 27. As a result, the gate voltage of the discharge switch 27 becomes less than the threshold voltage and the discharge switch 27 is set to the off-state.

The operation detecting unit 114 detects a gate voltage Vgs of the discharge switch 27 and outputs the discharge check signal ADcheck based on the detection voltage. The outputted discharge check signal ADcheck is inputted to the microcomputer 60 through the output-side insulating transmitting unit 131. The microcomputer 60 determines whether the input-side insulating transmitting unit 130, the input interface unit 111, the pulse command generating unit 112, and the drive circuit 113 are normal based on the inputted discharge check signal ADcheck. According to the present embodiment, whether the input-side insulating transmitting unit 130, the input interface unit 111, the pulse command generating unit 112, and the drive circuit 113 are normal is determined based on conditions (A) to (C), below.

(A) The discharge switch 27 is switched to the on-state in accompaniment with the drive command SgG being switched to the on-command, and the discharge switch 27 is switched to the off-state in accompaniment with the drive command SgG being switched to the off-command.

(B) The pulse width Tgon of the on-pulse command and the period in which the discharge switch 27 is in the on-state are equivalent.

(C) The number of on-pulse commands that are included in the drive command SgG and the number of times the discharge switch 27 is turned on based on the on-pulse commands during the pulse duration period Tdis are equal.

According to the present embodiment, when determined that the above-described conditions (A) to (C) are met based on the discharge check signal ADcheck, the microcomputer 60 determines that input-side insulating transmitting unit 130, the input interface unit 111, the pulse command generating unit 112, and the drive circuit 113 are normal. Meanwhile, when determined that at least one condition among the conditions (A) to (C) is not met, the microcomputer 60 determines that at least one among the input-side insulating transmitting unit 130, the input interface unit 111, the pulse command generating unit 112, and the drive circuit 113 is not normal. A specific example of a method for this determination will be described below.

The operation detecting unit 114 outputs the discharge check signal ADcheck that has logic H when the detected gate voltage Vgs is equal to or greater than a predetermined value thereof, and outputs the discharge check signal ADcheck that has logic L when the detected gate voltage Vgs is less than the predetermined value thereof. For example, the predetermined value may be set to the threshold voltage of the discharge switch 27, or a value that is higher than the threshold voltage of the discharge switch 27 and lower than the abnormality drive voltage Veps. The microcomputer 60 ascertains in advance transitions in the drive command SgG that is outputted from the pulse command generating unit 112 during the period in which the discharge command CmdAD is outputted.

A description of the above-described condition (A) is as follows. When determined that the logic of the discharge check signal ADcheck is switched to H during a first determination period after the logic of the discharge check signal ADcheck is switched to L, the microcomputer 60 determines that the discharge switch 27 is switched to the on-state in accompaniment with the drive command SgG being switched to the on-command. When determined that the logic of the discharge check signal ADcheck is not switched to H during the first determination period, the microcomputer 60 determines that the discharge switch 27 is not switched to the on-state regardless of the drive command SgG being switched to the on-command. For example, the first determination period may be set to a value that is longer than the pulse width Tgon and equal to or shorter than a total period (Tgon+Tgoff) of the pulse width Tgon and the time interval Tgoff. Specifically, the first determination period may be set to the total period.

In addition, when determined that the logic of the discharge check signal ADcheck is switched to L during a second determination period after the logic of the discharge check signal ADcheck is switched to H, the microcomputer 60 determines that the discharge switch 27 is switched to the off-state in accompaniment with the drive command SgG being switched to the off-command. When determined that the logic of the discharge check signal ADcheck is not switched to L during the second determination period, the microcomputer 60 determines that the discharge switch 27 is not switched to the on-state regardless of the drive command SgG being switched to the off-command. For example, the second determination period may be set to a value that is longer than the time interval Tgoff, and equal to or shorter than the total period of the pulse width Tgon and the time interval Tgoff. Specifically, the second determination period may be set to the total period.

A description of the above-described condition (B) is as follows. When determined that the period in which the logic of the inputted discharge check signal is H and the pulse width Tgon of the on-pulse command are equal, the microcomputer 60 determines that the condition (B) is met.

A description of the above-described condition (C) is as follows. When determined that the number of on-pulse commands that are included in the drive command SgG during the pulse duration period Tdis and the number of times the logic of the discharge check signal ADcheck is switched to H during the pulse duration period Tdis are equal, the microcomputer 60 determines that the condition (C) is met.

Steps in a process for confirming whether the discharge control of the smoothing capacitor 24 can be performed normally will be described with reference to FIG. 9.

At step S20, a startup command for the control system is issued. According to the present embodiment, when the high-order ECU determines that the starting switch 28 is set to the on-state, the startup command for the control system is issued by the high-order ECU switching the power supply switch 33 to the on-state. At step S21, the first interruption switch 23a and the second interruption switch 23b are switched to the on-state.

At step S22, completion of control preparation of the control circuit 50 is awaited. When a determination is made that the control preparation is completed, the process proceeds to step S23, and normal control is started. For example, normal control may be control in which a switching command for controlling a controlled variable of the rotating electric machine 10 to a command value thereof is generated and outputted.

According to the present embodiment, during a single trip from when the normal control is started until the control system is stopped, confirmation regarding whether the discharge control of the smoothing capacitor 24 can be performed normally is performed once. During the single trip, the confirmation can be performed at an arbitrary timing. In particular, according to the present embodiment, the microcomputer 60 performs the confirmation by outputting the discharge command CmdAD to the pulse command generating unit 112, with the start of normal control during the single trip.

At step S24, the microcomputer 60 determines whether the input-side insulating transmitting unit 130, the input interface unit 111, the pulse command generating unit 112, and the drive circuit 113 are normal by the method using the above-described conditions (A) to (C), based on the discharge check signal ADcheck that is outputted from the operation detecting unit 114. Here, according to the present embodiment, the microcomputer 60 includes a "discharge command unit" and a "discharge determining unit."

According to the present embodiment, the confirmation regarding whether the discharge control of the smoothing capacitor 24 can be performed normally is performed in parallel with the normal control. In contrast, when this confirmation is performed after the first and second interruption switches 23a and 23b are switched to the off-state after the end of normal control, an issue described below may occur.

That is, when the first and second interruption switches 23a and 23b are set to the off-state, the high-voltage power supply 30 and the smoothing capacitor 24 are electrically disconnected. In this case, the power supply source of the abnormality power supply 90 and the drive power supply 120 becomes the smoothing capacitor 24, rather than the high-voltage power supply 30.

Here, when the discharge switch 27 is set to the on-state by the discharge control of the smoothing capacitor 24, discharge from the smoothing capacitor 24 is performed and the power supply source of the abnormality power supply 90 and the drive power supply 120 is depleted. As a result, the abnormality drive voltage Veps cannot be supplied from the abnormality power supply 90 to the drive circuit 113. In addition, the drive voltage Vsb cannot be supplied from the drive power supply 120 to the input interface unit 111, the pulse command generating unit 112, and the operation detecting unit 114. As a result, the drive circuit 113, the input interface unit 111, the pulse command generating unit 112, and the operation detecting unit 114 cannot be operated.

Here, when the drive command includes the plurality of on-pulse commands, the discharge of the smoothing capacitor 24 may be completed by the on-state of the discharge switch 27 based on the first on-pulse command. In this case, because the drive circuit 113, the input interface unit 111, the pulse command generating unit 112, and the operation detecting unit 114 cannot be operated, whether the discharge switch 27 is being driven as intended based on the second and subsequent on-pulse commands cannot be confirmed.

Regarding this point, according to the present embodiment, the confirmation regarding whether the discharge control of the smoothing capacitor 24 is being performed normally is performed in parallel with the normal control, based on the discharge check signal ADcheck. That is, the confirmation regarding whether the discharge control of the smoothing capacitor 24 can be performed normally is performed in a state in which the first and second interruption switches 23a and 23b are set to the on-state. Therefore, the abnormality power supply 90 and the drive power supply 120 can be operated with the high-voltage power supply 30 as the power supply source, and the drive circuit 113, the input interface unit 111, the pulse command generating unit 112, and the operation detecting unit 114 can be operated. Consequently, whether the discharge switch 27 is being driven as intended based on the second and subsequent on-pulse commands can be confirmed.

Here, the confirmation regarding whether the discharge control of the smoothing capacitor 24 is being performed normally may be performed under a condition that the voltage of the high-voltage power supply 30 is equal to or greater than a predetermined voltage. This is in light of a current flowing from the high-voltage power supply 30 to the discharge resistor 26 when the discharge switch 27 is set to the on-state by the discharge control of the smoothing capacitor 24, and electric power of the high-voltage power 30 supply being consumed.

When determined that the discharge control of the smoothing capacitor 24 is being performed normally at step S24, the microcomputer 60 continues the normal control. Subsequently, at step S25, whether a stop command for the control system is issued is determined. According to the present embodiment, the stop command is considered to be issued by the high-order ECU determining that the starting switch 28 is set to the off-state. In this case, the high-order ECU instructs the microcomputer 60 to perform a subsequent end sequence.

At step S26, the first interruption switch 23a and the second interruption switch 23b are switched to the off-state.

At step S27, the microcomputer 60 outputs the discharge command CmdAD to the pulse command generating unit 112. The pulse command generating unit 112 outputs the drive command SgG shown in earlier FIG. 8B to the drive circuit 113 during the period in which the discharge command CmdAD is inputted. Then, the drive control of the discharge switch 27 is performed based on the drive command SgG, and the discharge of the smoothing capacitor 24 is performed.

At step S28, the microcomputer 60 determines whether the discharge of the smoothing capacitor 24 using the discharge resistor 26 is being performed normally based on the terminal voltage VHd of the smoothing capacitor 24 that is detected by the voltage sensor 77, during the period in which the terminal voltage of the smoothing capacitor 24 decreases towards 0 as a result of the discharge being performed. Specifically, when determined that a state of decrease of the detected terminal voltage VHd of the smoothing capacitor 24 and a state of decrease of the terminal voltage of the smoothing capacitor 24 when the discharge of the smoothing capacitor 24 is being performed normally are equivalent, the microcomputer 60 determines that the discharge of the smoothing capacitor 24 is being performed normally, that is, the drive circuit 113, the discharge switch 27, and the discharge resistor 26 are normal.

Meanwhile, when determined that the state of decrease of the detected terminal voltage VHd of the smoothing capacitor 24 and the state of decrease of the terminal voltage of the smoothing capacitor 24 when the discharge of the smoothing capacitor 24 is being performed normally are not equivalent, the microcomputer 60 determines that the discharge of the smoothing capacitor 24 is not performed normally, that is, at least one of the drive circuit 113, the discharge switch 27, and the discharge resistor 26 is not normal. The microcomputer 60 determines that the discharge control of the smoothing capacitor 24 can be performed normally by determining normality at each of steps S24 and S28.

In addition to whether the discharge control of the smoothing capacitor 24 is normal being confirmed at step S24, whether the discharge control of the smoothing capacitor 24 is normal is confirmed at step S28 for a reason described below.

In a confirmation process at step S24, the drive signal SgG is outputted from the pulse command generating unit 112 to the drive circuit 113 with the discharge command CmdAD from the microcomputer 60 as a trigger. Then, the discharge check signal ADcheck that is based on the gate voltage Vgs of the discharge switch 27 is transmitted to the microcomputer 60. Therefore, the discharge check signal ADcheck serves as a parameter for ascertaining whether a path from the microcomputer 60 to the gate of the discharge switch 27 via the drive circuit 113 is normal.

However, even if the transitions in the discharge check signal ADcheck based on the gate voltage Vgs and the transitions in the drive command SgG are equivalent, the discharge switch 27 is not necessarily guaranteed to be set to the on-state and the off-state as indicated by the drive command SgG.

Therefore, according to the present embodiment, at step S28, whether the discharge of the smoothing capacitor 24 using the discharge resistor 26 is being performed normally is confirmed based on the terminal voltage VHd of the smoothing capacitor 24 that is detected by the voltage sensor 77. When the state of decrease of the terminal voltage VHd of the smoothing capacitor 24 and the state of decrease of the terminal voltage of the smoothing capacitor 24 when the discharge of the smoothing capacitor 24 is being performed normally are equivalent, the discharge switch 27 is thought to be set to the on-state and the off-state as indicated by the drive command SgG. Consequently, as a result of the process at step S28 being performed in addition to the process at step S24, determination accuracy regarding whether the discharge control of the smoothing capacitor 24 can be performed normally can be improved.

Here, when the discharge of the smoothing capacitor 24 is completed by the process at step S28, the abnormality power supply 90 and the drive power supply 120 cannot output electric power. Therefore, the input interface unit 111, the pulse command generating unit 112, the drive circuit 113, and the operation detecting unit 114 cannot be operated. In addition, according to the present embodiment, when the process at step S28 is performed in a state in which the first and second interruption switches 23a and 23b are switched to the off-state, the discharge of the smoothing capacitor 24 is completed by the on-state of the discharge switch 27 based on the first on-pulse command.

At step S29, the microcomputer 60 stores content of the abnormality that has occurred in a memory that that is provided in the microcomputer 60 and serves as a storage unit, when determined that the discharge control of the smoothing capacitor 24 is not performed normally at at least either of the steps S24 and S28. A memory 60a is a non-transitory computer-readable storage medium other than a read-only memory (ROM) (such as a non-volatile memory other than the ROM).

When the predetermined end sequence is completed, at step S30, the power supply switch 33 is switched to the off-state by the high-order ECU. As a result, power supply from the low-voltage power supply 31 to the control circuit 50 is stopped.

Here, when determined that the discharge control of the smoothing capacitor 24 cannot be performed normally at step S24, the microcomputer 60 proceeds to step S31 and performs a warning display process to notify the user thereof and also switches a traveling mode of the vehicle to an evacuation traveling mode. At step S32, the microcomputer 60 performs the discharge of the smoothing capacitor 24 by sending a current to the windings 11 by the switching device unit 20. Then, at step S33, the first interruption switch 23a and the second interruption switch 23b are switched to the off-state and the process subsequently proceeds to step S29.

According to the present embodiment described in detail above, the following effects can be obtained.

Figure 9:
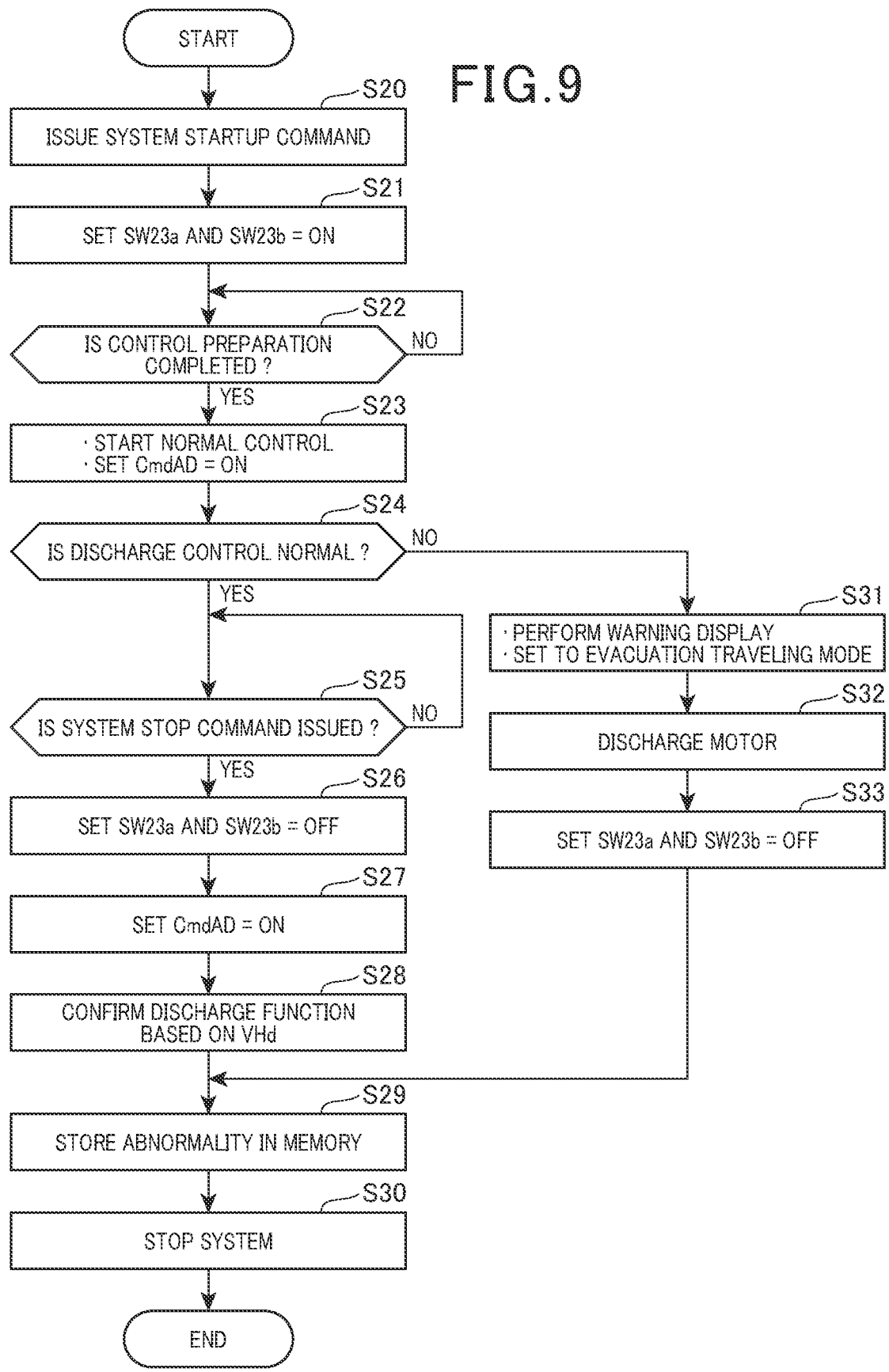
FIG. 9 is a flowchart illustrating steps in a process for determining whether discharge control can be performed normally.

The confirmation regarding whether the discharge control of the smoothing capacitor 24 can be performed normally is performed by the process at step S24 in FIG. 9, in parallel with the normal control. A state in which the normal control is performed is a state in which the first and second interruption switches 23a and 23b are set to the on-state. Therefore, the abnormality power supply 90 and the drive power supply 120 can be operated with the high-voltage power supply 30 as the power supply source. The drive circuit 113, the input interface unit 111, the pulse command generating unit 112, and the operation detecting unit 114 can be operated. As a result, whether the discharge switch 27 is being driven as intended based on the second and subsequent on-pulse commands can be confirmed.

A confirmation process of the same content as the process at step S24 in FIG. 9 being performed during a period from when a stop command for the control system is issued by the starting switch 28 being switched to the off-state until the first and second interruption switches 23a and 23b are switched to the off-state can be considered. However, in this case, the confirmation regarding whether the discharge control of the smoothing capacitor 24 can be performed normally is completed after the elapse of the pulse duration period Tdis is awaited after the starting switch 28 is switched to the off-state. In this case, an amount of time from when the starting switch 28 is switched to the off-state until the process at step S28 is completed is long. An amount of time required for the end sequence becomes long.

In this regard, according to the present embodiment, because the confirmation process at step S24 is performed in parallel with the normal control, the end sequence can be prevented from becoming long.

The operation detecting unit 114 detects the gate voltage Vgs of the discharge switch 27 and outputs the discharge check signal ADcheck based on the detected gate voltage Vgs to the microcomputer 60. The microcomputer 60 determines whether the input-side insulating transmitting unit 130, the input interface unit 111, the pulse command generating unit 112, and the drive circuit 113 are normal based on the discharge check signal ADcheck that changes based on the gate voltage Vgs. A signal flows to the input-side insulating transmitting unit 130, the input interface unit 111, the pulse command generating unit 112, the drive circuit 113, and the gate of the discharge switch 27 in this order.

Therefore, the gate voltage Vgs of the discharge switch 27 that is on a most downstream side of a signal flow path among the input-side insulating transmitting unit 130, the input interface unit 111, the pulse command generating unit 112, the drive circuit 113, and the discharge switch 27 is useful information for determining whether each of the input-side insulating transmitting unit 130, the input interface unit 111, the pulse command generating unit 112, and the drive circuit 113 is normal. Consequently, as a result of the discharge check signal ADcheck that changes based on the gate voltage Vgs being used, whether the input-side insulating transmitting unit 130, the input interface unit 111, the pulse command generating unit 112, and the drive circuit 113 are normal can be appropriately determined.

Here, even if the input-side insulating transmitting unit 130, the input interface unit 111, the pulse command generating unit 112, and the drive circuit 113 be normal, the discharge switch 27 being set to the on-state and the off-state as indicated by the drive command SgG is not necessarily guaranteed.

Therefore, according to the present embodiment, in the confirmation process at step S28, whether the discharge of the smoothing capacitor 24 using the discharge resistor 26 is being performed normally is determined based on the terminal voltage VHd of the smoothing capacitor 24 that is detected by the voltage sensor 77. The state of decrease of the terminal voltage of the smoothing capacitor 24 differs between when the discharge is being performed normally and when the discharge is being not performed normally. Therefore, the terminal voltage VHd of the smoothing capacitor is useful information for determining whether the discharge of the smoothing capacitor 24 using the discharge resistor 26 is being performed normally. Consequently, as a result of the terminal voltage VHd of the smoothing capacitor 24 being used, the discharge switch 27 being able to be driven as intended can be guaranteed, and further, the discharge control of the smoothing capacitor 24 being able to be performed normally can be guaranteed.

When the processes at steps S24 and S28 in FIG. 9 are performed, the pulse command generating unit 112 outputs the drive command SgG that includes the on-pulse commands. Therefore, the discharge switch 27 and the discharge resistor 26 being continuously energized can be prevented. The amount of heat generation in the discharge switch 27 and the discharge resistor 26 can be reduced. Consequently, the discharge switch 27 and the discharge resistor 26 that are small in size can be used.

Variation Examples According to the First Embodiment

The drive command SgG that is outputted from the pulse command generating unit 112 is not limited to that shown in FIGS. 8A and 8B. For example, the pulse command generating unit 112 may output the drive command SgG that includes one or two on-pulse commands during the pulse duration period Tdis, after the discharge command CmdAD is inputted. Here, when the drive command SgG includes a one on-pulse command, the above-described condition (C) is unnecessary.

In addition, the drive command SgG is not limited to that which includes the on-pulse command and may be the drive command SgG that is the on-command at all times during the period in which the discharge command CmdAD is inputted.

An execution timing of the confirmation process described at step S24 in FIG. 9 is not limited to the start of normal control during a single trip. For example, the execution timing may be when the vehicle is stopped after the start of normal control during a single trip.

In addition, for example, the execution timing of the confirmation process described at step S24 may be set within a period from when the starting switch 28 is switched to the off-state until the power supply switch 33 is switched to the off-state, such as immediately before step S26.

The confirmation regarding whether the discharge control of the smoothing capacitor 24 is being performed normally may be performed a plurality of times during a single trip.

The above-described condition (B) may be eliminated if the thermal design of the discharge resistor 26 allows for it.

The microcomputer 60 may output the discharge command CmdAD to the discharge processing unit 110 and the discharge control of the smoothing capacitor 24 may be performed simultaneously with the three-phase short-circuit control being performed by the process in earlier FIG. 5.

The high-voltage-side ASC command unit 91 may not be provided in the control circuit 50.

The microcomputer 60 may be provided in the high-voltage region of the control circuit 50.

As the three-phase short-circuit control, control to turn on the upper-arm switches SWH of the three phases and turn off the lower-arm switches SWL of the three phases may be performed. In this case, the abnormality power supply 90 may be individually provided for each of the upper-arm drive units 81a of the three phases.

Figure 4:
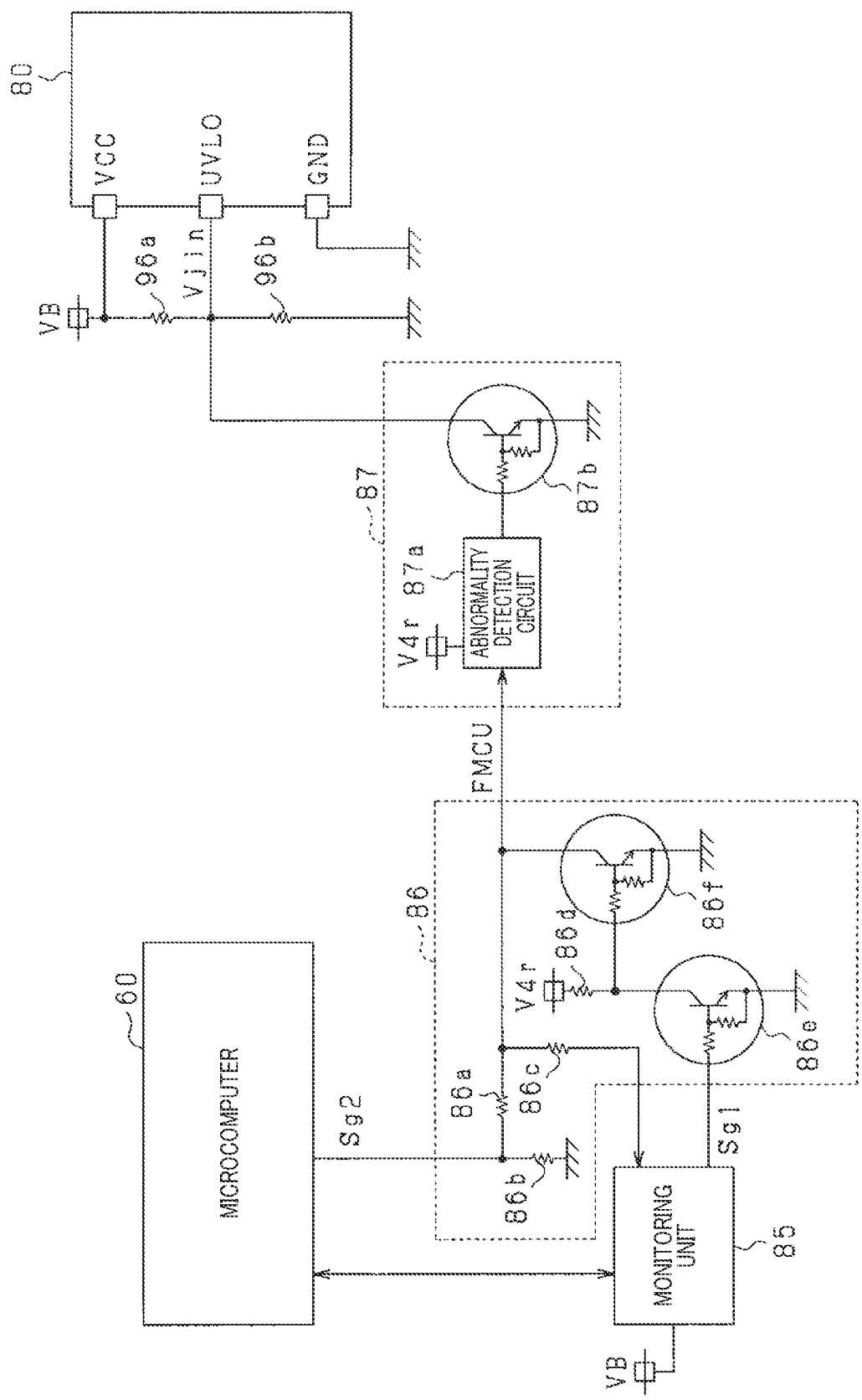
FIG. 4 is a diagram illustrating an OR circuit, a power supply stopping unit, and peripheral configurations thereof.

In FIG. 4, either of the first determination signal Sg1 and the second determination signal Sg2 may be a generation source of the abnormality notification signal FMCU for stopping the insulating power supply 80.

The high-voltage-side ASC command unit 91 may output the high-voltage-side ASC command SgASC based on the upper-arm drive voltage VdH, instead of the lower-arm drive voltage VdL. In this case, the high-voltage-side ASC command unit 91 may acquire information on the upper-arm drive voltage VdH through the insulating transmitting unit.

The voltage that is supplied to the monitoring unit 85 is not limited to the output voltage VB of the input circuit 61 and may be the voltage of another power supply as long as the voltage is other than the output voltages of the first to third low-voltage power supply circuit 63 to 65.

The power supply control unit that configures the insulating power supply 80 may be individually provided for each of the upper-arm insulating power supplies and the lower-arm insulating power supply. In this case, the insulating power supply 80 may be stopped by the power supply control unit that is provided in correspondence with the upper-arm insulating power supply and the power supply control unit that is provided in correspondence with the lower-arm insulating power supply both being stopped by the low-voltage erroneous operation prevention process.

When a coupler abnormality in which the first voltage V1r of the first low-voltage power supply circuit 63 is not supplied to the configuration on the low-voltage region side of the upper- and lower-arm insulating transmitting units 81b and 82b that configure the upper- and lower-arm drivers 81 and 82 occurs, the switching command from the microcomputer 60 cannot be transmitted to the upper- and lower-arm drive units 81a and 82a. In this case, the shutdown state occurs. To counter this issue, a configuration described below can be used.

The power supply source for the configuration on the low-voltage region side of the lower-arm insulating transmitting unit 82b is a power supply circuit (hereafter, other power supply circuit) other than the first low-voltage power supply circuit 63. For example, as the other power supply circuit, a power supply in which a dependent failure does not occur when an abnormality occurs in the first low-voltage power supply circuit 63 can be used. Specifically, for example, a fifth power supply circuit that generates the fifth voltage V5r (such as 5 V) by stepping down the output voltage Vm of the intermediate power supply circuit 62 can be used.

In this configuration, the insulating power supply 80 may be stopped when the output voltage of the other power supply circuit decreases, and the high-voltage-side ASC command SgASC may be outputted to the lower-arm drive unit 82a from the high-voltage-side ASC command unit 91. Specifically, for example, the abnormality detection circuit 87a of the power supply stopping unit 87 may detect the output voltage of the other power supply circuit and switch the switching switch 87b to on when the detected output voltage decreases. As a result of the configuration described above, the three-phase short-circuit control can be performed even when a coupler abnormality occurs.

Second Embodiment

Figure 10:
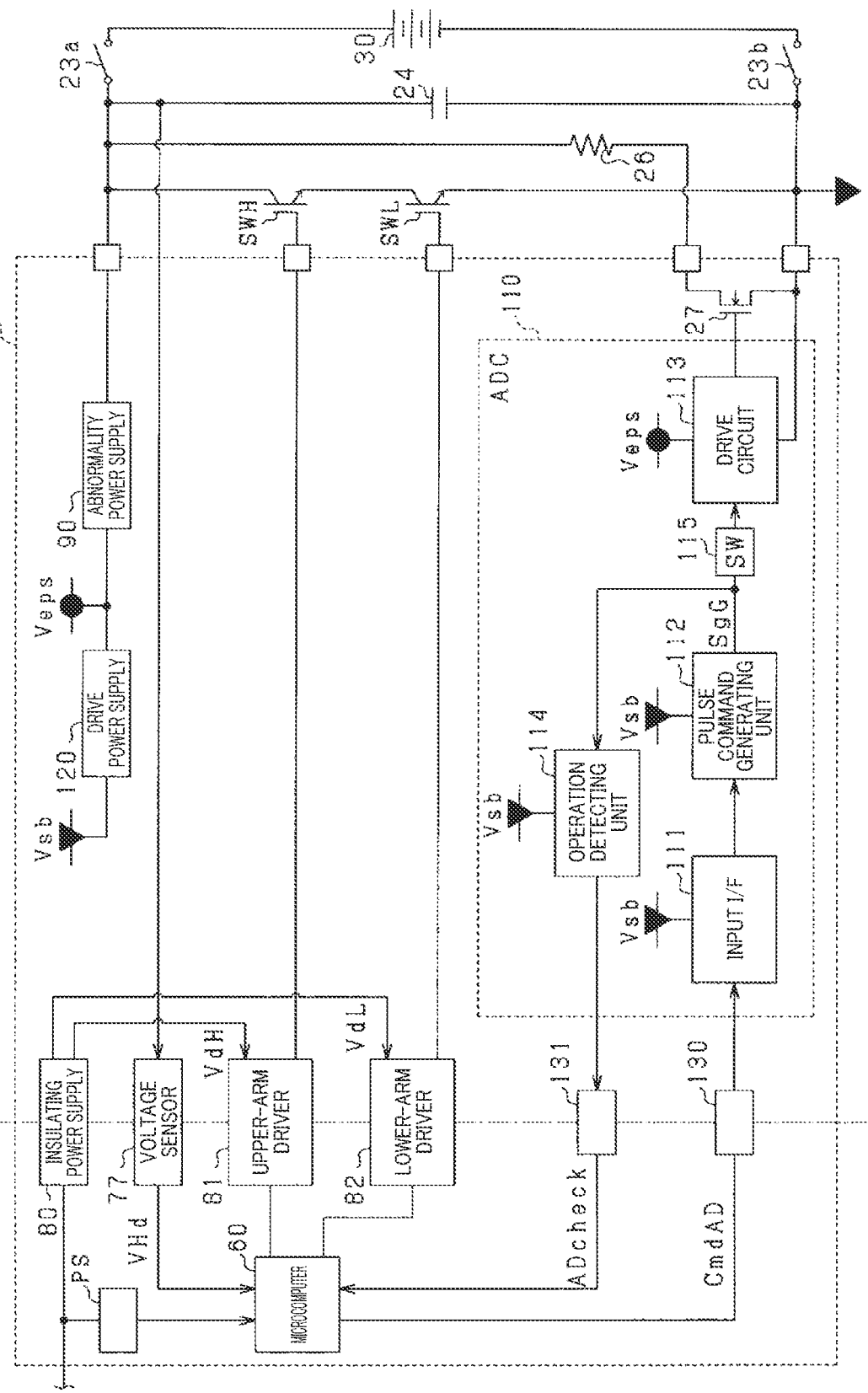
FIG. 10 is a diagram illustrating a discharge processing unit according to a second embodiment and peripheral configurations thereof.

A second embodiment will be described below with reference to the drawings, mainly focusing on differences with the first embodiment. According to the present embodiment, as shown in FIG. 10, the configuration of the discharge processing unit 110 is modified. In FIG. 10, configurations that are identical to the configurations shown in earlier FIG. 7 are given the same reference numbers for convenience.

The discharge processing unit 110 includes a signal interrupting unit 115 that connects the pulse command generating unit 112 and the drive circuit 113. The signal interrupting unit 115 transmits the drive command SgG from the pulse command generating unit 112 to the drive circuit 113 by being set to a signal transmitting state and interrupts transmission of the drive command SgG from the pulse command generating unit 112 to the drive circuit 113 by being set to the signal interrupting state. According to the present embodiment, the signal interrupting unit 115 is configured by a switch and is operated by the microcomputer 60 according to the present embodiment.

According to the present embodiment, the signal interrupting unit 115 is configured by a switch that is set to on during the normal control. As a result, driving of the discharge switch 27 is possible during the normal control and the discharge control of the smoothing capacitor 24 can be performed.

The operation detecting unit 114 detects the drive command SgG that is outputted from the pulse command generating unit 112 and outputs the discharge check signal ADcheck based on the detection value thereof. The microcomputer 60 determines whether the input-side insulating transmitting unit 130, the input interface unit 111, and the pulse command generating unit 112 are normal based on the inputted discharge check signal ADcheck. A specific example of a method for this determination will be described below.

The operation detecting unit 114 outputs the discharge check signal ADcheck that has logic H when the detected drive command SgG is the on-command and outputs the discharge check signal ADcheck that has logic L when the detected drive command SgG is the off-command. Then, the microcomputer 60 may determine whether the input-side insulating transmitting unit 130, the input interface unit 111, and the pulse command generating unit 112 are normal by a method that is similar to the method described according to the first embodiment, based on the discharge check signal ADcheck.

Figure 11:
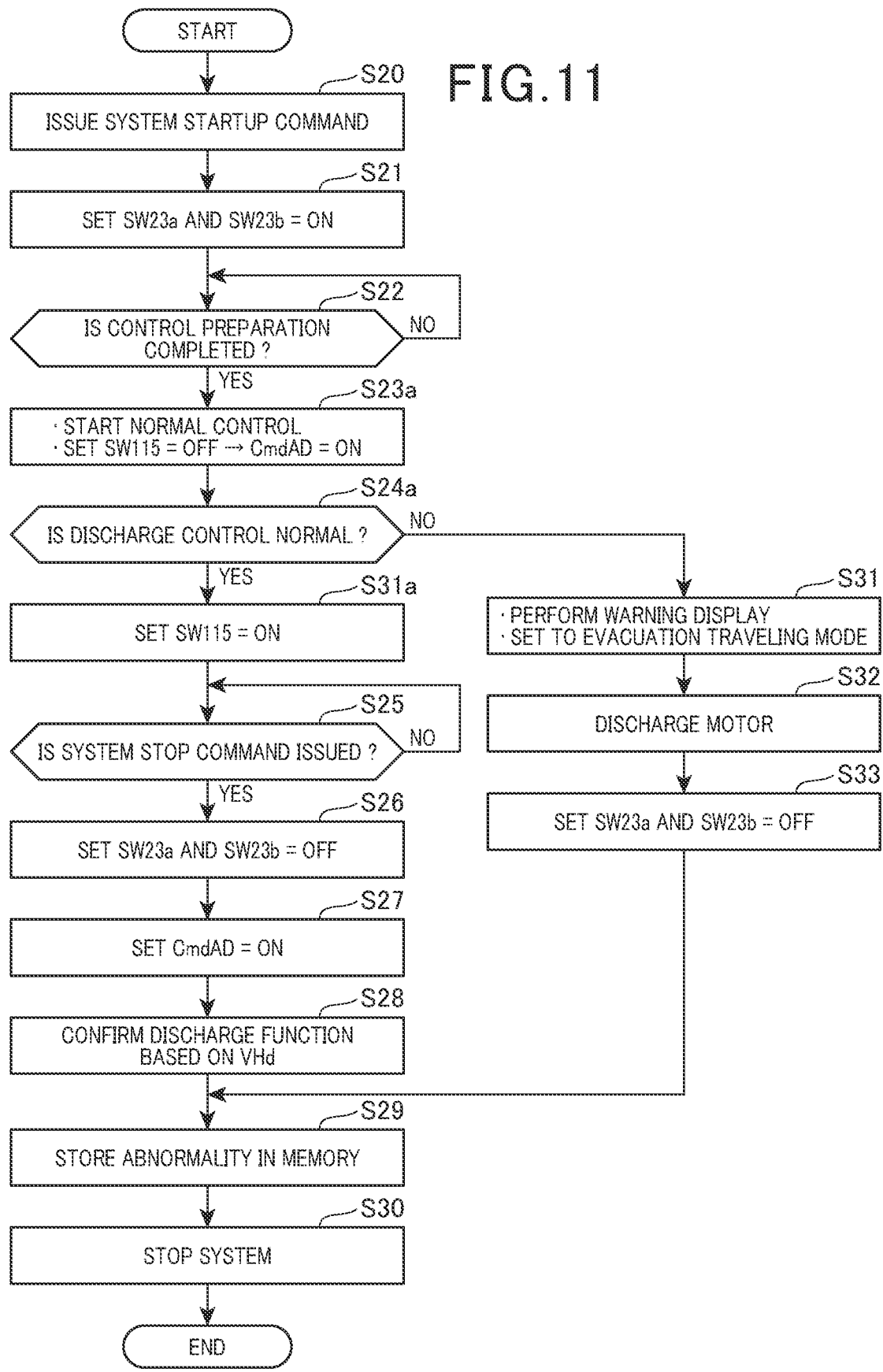
FIG. 11 is a flowchart of steps in a process for determining whether discharge control can be performed normally.

Next, steps in a process for confirming whether the discharge control of the smoothing capacitor 24 can be performed normally will be describe with reference to FIG. 11. Here, in FIG. 11, processes that are identical to the processes in earlier FIG. 9 are given the same reference numbers for convenience.

At step S23a, the microcomputer 60 starts the normal control and also switches the signal interrupting unit 115 to the off-state and sets the signal interrupting unit 115 to the signal interrupting state. The signal interrupting unit 115 is switched to the signal interrupting state to prevent the discharge switch 27 from being set to the on-state when the drive command SgG is the on-command. Then, the microcomputer 60 outputs the discharge command CmdAD to the pulse command generating unit 112.

Subsequently, at step S24a, the microcomputer 60 determines whether the input-side insulating transmitting unit 130, the input interface unit 111, and the pulse command generating unit 112 are normal by the above-described method, based on the discharge check signal ADcheck that is outputted from the operation detecting unit 114.

When determined that the input-side insulating transmitting unit 130, the input interface unit 111, and the pulse command generating unit 112 are normal, the microcomputer 60 proceeds to step S31a and switches the signal interrupting unit 115 to the on-state and sets the signal interrupting unit 115 to the signal transmitting state. This is in preparation for discharge of the smoothing capacitor 24 by the discharge control of the smoothing capacitor 24.

According to the present embodiment described in detail above, the following effects are obtained.

The operation detecting unit 114 detects the drive command SgG that is outputted from the pulse command generating unit 112 and outputs the discharge check signal ADcheck that corresponds to the detection value to the microcomputer 60. The microcomputer 60 determines whether the input-side insulating transmitting unit 130, the input interface unit 111, and the pulse command generating unit 112 are normal based on the discharge check signal ADcheck that changes depending on the drive command SgG. The drive command SgG that is outputted from the pulse command generating unit 112 may change based on whether the input-side insulating transmitting unit 130, the input interface unit 111, and the pulse command generating unit 112 are normal.

Therefore, the drive command SgG is useful information for determining whether the input-side insulating transmitting unit 130, the input interface unit 111, and the pulse command generating unit 112 are normal. Consequently, as a result of the discharge check signal ADcheck that changes depending on the drive command SgG being used, whether the input-side insulating transmitting unit 130, the input interface unit 111, and the pulse command generating unit 120 are normal can be appropriately determined.

At steps S23a and S24a in FIG. 11, the pulse command generating unit 112 outputs the drive command SgG to the drive circuit 113 when the signal interrupting unit 115 is set to the signal interrupting state. Because the signal interrupting unit 115 is set to the signal interrupting state, the discharge switch 27 is not set to the on-state. As a result, whether the input-side insulating transmitting unit 130, the input interface unit 111, and the pulse command generating unit 112 are normal can be determined without a current being sent to the discharge resistor 26. Consequently, the discharge switch 27 and the discharge resistor 26 being placed in an overheating state, and degradation of the discharge switch 27 and the discharge resistor 26 advancing, can be prevented. In addition, power consumption of the high-voltage power supply 30 accompanying the discharge switch 27 being set to the on-state can be made unnecessary.

Third Embodiment

Figure 12:
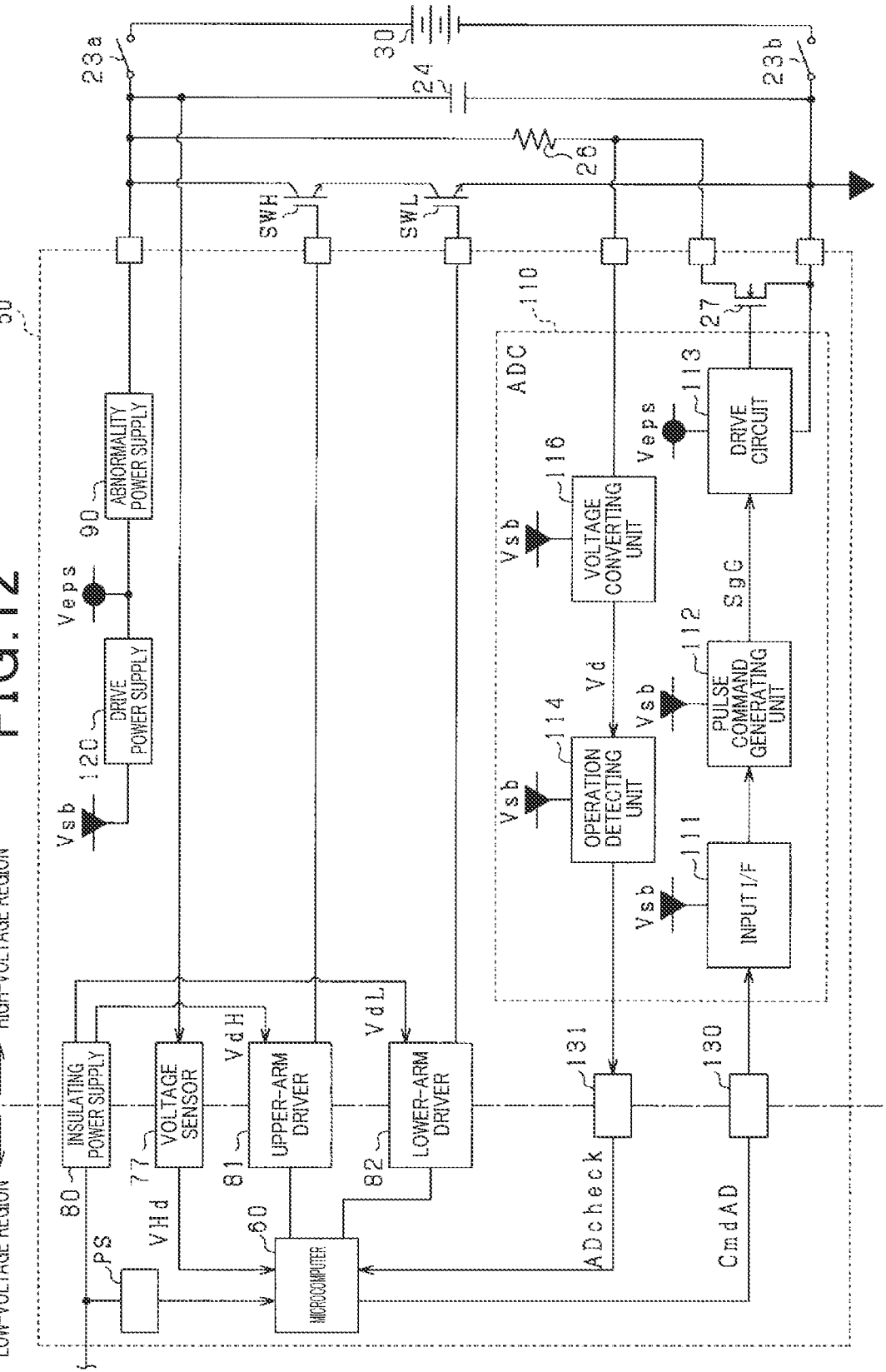
FIG. 12 is a diagram of a discharge processing unit according to a third embodiment and peripheral configurations thereof.

A third embodiment will be described below with reference to the drawings, mainly focusing on differences with the first embodiment. According to the present embodiment, as shown in FIG. 12, the configuration of the discharge processing unit 110 is modified. In FIG. 12, configurations that are identical to the configurations shown in earlier FIG. 7 are given the same reference numbers for convenience.

The discharge processing unit 110 includes a voltage converting unit 116. The voltage converting unit 116 converts a voltage at a connection point between the discharge resistor 26 and a drain of the discharge switch 27 to a lower voltage. According to the present embodiment, the voltage converting unit 116 is configured to be capable of operating by being supplied the drive voltage Vsb of the drive power supply 120. A voltage Vd that is converted by the voltage converting unit 116 is inputted to the operation detecting unit 114.

The operation detecting unit 114 outputs the discharge check signal ADcheck based on the converted voltage Vd (that is, the voltage at the connection point between the discharge resistor 26 and the drain of the discharge switch 27). When the first and second interruption switches 23a and 23b are set to the on-state, the microcomputer 60 determines whether the drive circuit 113, the discharge switch 27, and the discharge resistor 26, in addition to the input-side insulating transmitting unit 130, the input interface unit 111, and the pulse command generating unit 112, are normal. Hereafter, a specific example of a method for this determination will be described.

When an electric potential on the source side of the discharge switch 27 is a reference potential, when the discharge switch 27 is set to the on-state, the voltage at the connection point between the discharge resistor 26 and the drain of the discharge switch 27 decreases to near 0 V. Meanwhile, when the discharge switch 27 is set to the off-state, the voltage at the connection point between the discharge resistor 26 and the drain of the discharge switch 27 increases to near the terminal voltage of the high-voltage power supply 30. According to the present embodiment, the operation detecting unit 114 outputs the discharge check signal ADcheck that has logic H when the detection voltage Vd is near the terminal voltage of the high-voltage power supply 30, and outputs the discharge check signal ADcheck that has logic L when the detection voltage Vd is near 0 V.

In a manner similar to the process at step S28 in FIG. 9 according to the first embodiment, the process described above for determining whether the drive circuit 113, the discharge switch 27, and the discharge resistor 26 are normal based on the detection voltage Vd guarantees that the discharge switch 27 is set to the on-state and the off-state as indicated by the drive command SgG. The microcomputer 60 may determine whether the input-side insulating transmitting unit 130, the input interface unit 111, the pulse command generating unit 112, the drive circuit 113, the discharge switch 27, and the discharge resistor 16 are normal by a method similar to the method described according to the first embodiment, based on the discharge check signal ADcheck.

Figure 13:
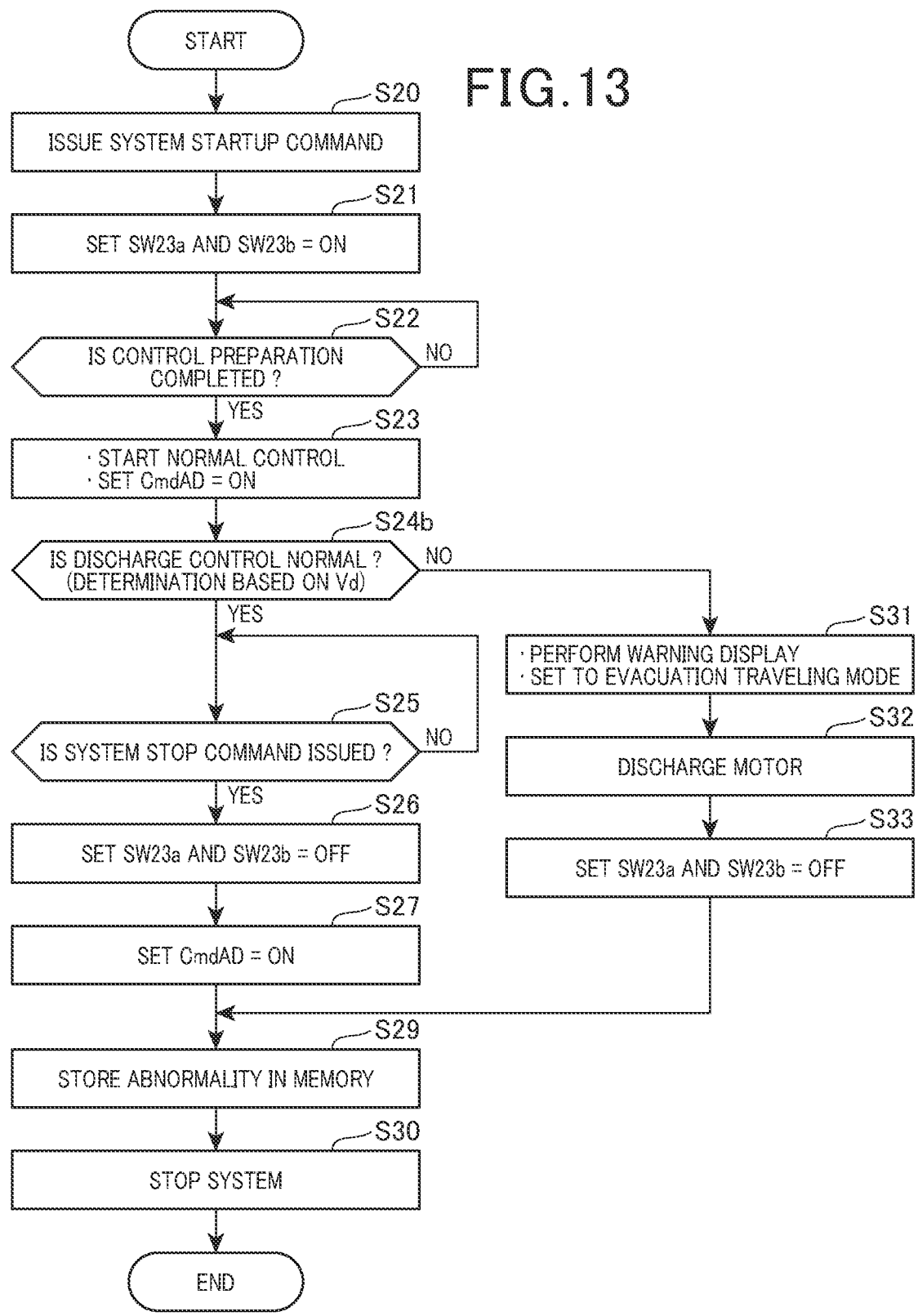
FIG. 13 is a flowchart of steps in a process for determining whether discharge control can be performed normally.

Next, steps in a process for confirming whether the discharge control of the smoothing capacitor 24 can be performed normally will be describe with reference to FIG. 13. Here, in FIG. 13, processes that are identical to the processes in earlier FIG. 9 are given the same reference numbers for convenience.

At step S24b, the microcomputer 60 determines whether the input-side insulating transmitting unit 130, the input interface unit 111, the pulse command generating unit 112, the drive circuit 113, the discharge switch 27, and the discharge resistor 26 are normal by the above-described method, based on the discharge check signal ADcheck that is outputted from the operation detecting unit 114. According to the present embodiment, whether the discharge switch 27 and the discharge resistor 26 are normal is also determined at step S24b. Therefore, the process at step S28 in earlier FIG. 9 is unnecessary.

According to the present embodiment described in detail above, the following effects are obtained.

The operation detecting unit 114 acquires the detection voltage Vd based on the voltage at the connection point between the discharge resistor 26 and the drain of the discharge switch 27, and outputs the discharge check signal ADcheck based on the detection voltage Vd to the microcomputer 60. The microcomputer 60 determines whether the input-side insulating transmitting unit 130, the input interface unit 111, the pulse command generating unit 112, the drive circuit 113, the discharge switch 27, and the discharge resistor 26 are normal based on the discharge check signal ADcheck that changes based on the detection voltage Vd. A signal flows to the input-side insulating transmitting unit 130, the input interface unit 111, the pulse command generating unit 112, the drive circuit 113, and the gate of the discharge switch 27 in this order.

As a result, the drive control of the discharge switch 27 is performed and discharge of the smoothing capacitor 24 is performed. In this case, the voltage at the connection point between the discharge resistor 26 and the drain of the discharge switch 27 changes between when the discharge switch 27 is set to the on-state and when the discharge switch 27 is set to the off-state. Therefore, the voltage is useful information for determining whether the input-side insulating transmitting unit 130, the input interface unit 111, the pulse command generating unit 112, the drive circuit 113, the discharge switch 27, and the discharge resistor 26 are normal. Consequently, as a result of the above-described detection voltage Vd, being used, whether the input-side insulating transmitting unit 130, the input interface unit 111, the pulse command generating unit 112, the drive circuit 113, the discharge switch 27, and the discharge resistor 26 are normal can be appropriately determined.

In addition, as a result of the detection voltage Vd being used, the process at step S28 in earlier FIG. 9 becomes unnecessary. Consequently, the amount of time required for the end sequence can be shortened.

Fourth Embodiment

Figure 14:
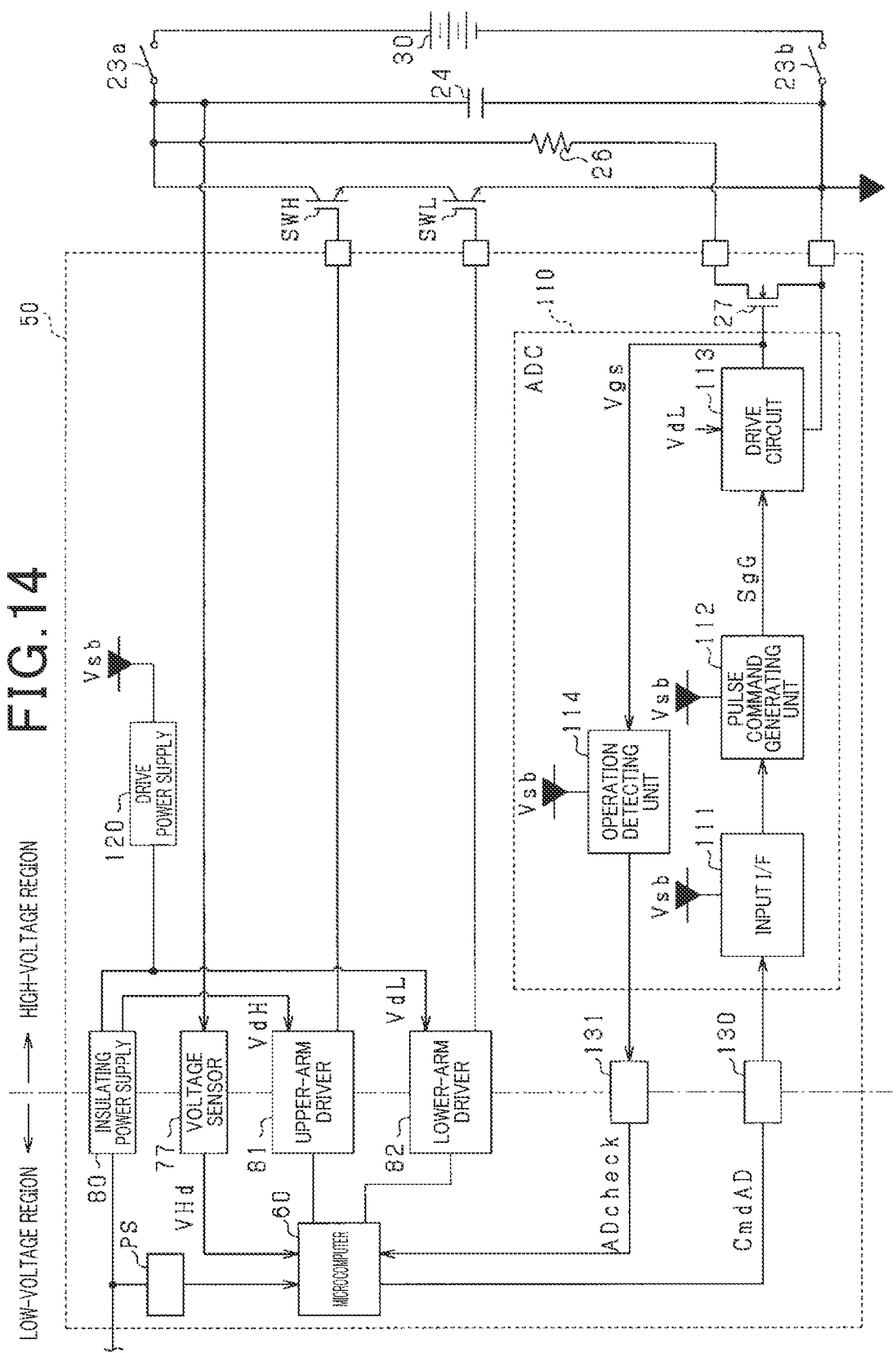
FIG. 14 is a diagram of a discharge processing unit according to a fourth embodiment and peripheral configurations thereof.

A fourth embodiment will be described below with reference to the drawings, mainly focusing on differences with the first embodiment. According to the present embodiment, as shown in FIG. 14, the abnormality power supply 90 is not provided in the control circuit 50. In FIG. 14, configurations that are identical to the configurations shown in earlier FIG. 7 are given the same reference numbers for convenience.

The drive power supply 120 generates the drive voltage Vsb by being supplied the lower-arm drive voltage VdL of the insulating power supply 80 rather than the high-voltage power supply 30. In addition, the drive circuit 113 is capable of operating by being supplied the lower-arm drive voltage VdL of the insulating power supply 80.

According to the present embodiment described above, effects similar to those according to the first embodiment can be obtained, excluding cases in which an abnormality in which the drive voltage Vsb cannot be outputted from the drive power supply 120 occur, such as when an abnormality in which the voltage cannot be outputted from the insulating power supply 80 to the drive power supply 120 or an abnormality in the drive power supply 120 occurs. Here, an abnormality in which the voltage cannot be outputted from the insulating power supply 80 to the drive power supply 120 includes an abnormality in the insulating power supply 20, and an abnormality in which electric power cannot be supplied from the low-voltage power supply 31 to the insulating power supply 80.

Here, the drive power supply 120 may generate the drive voltage Vsb by being supplied the upper-arm drive voltage VdH of the insulating power supply 80. In addition, the drive circuit 113 may be capable of operating by being supplied the upper-arm drive voltage VdH of the insulating power supply 80.

Fifth Embodiment

Figure 15:
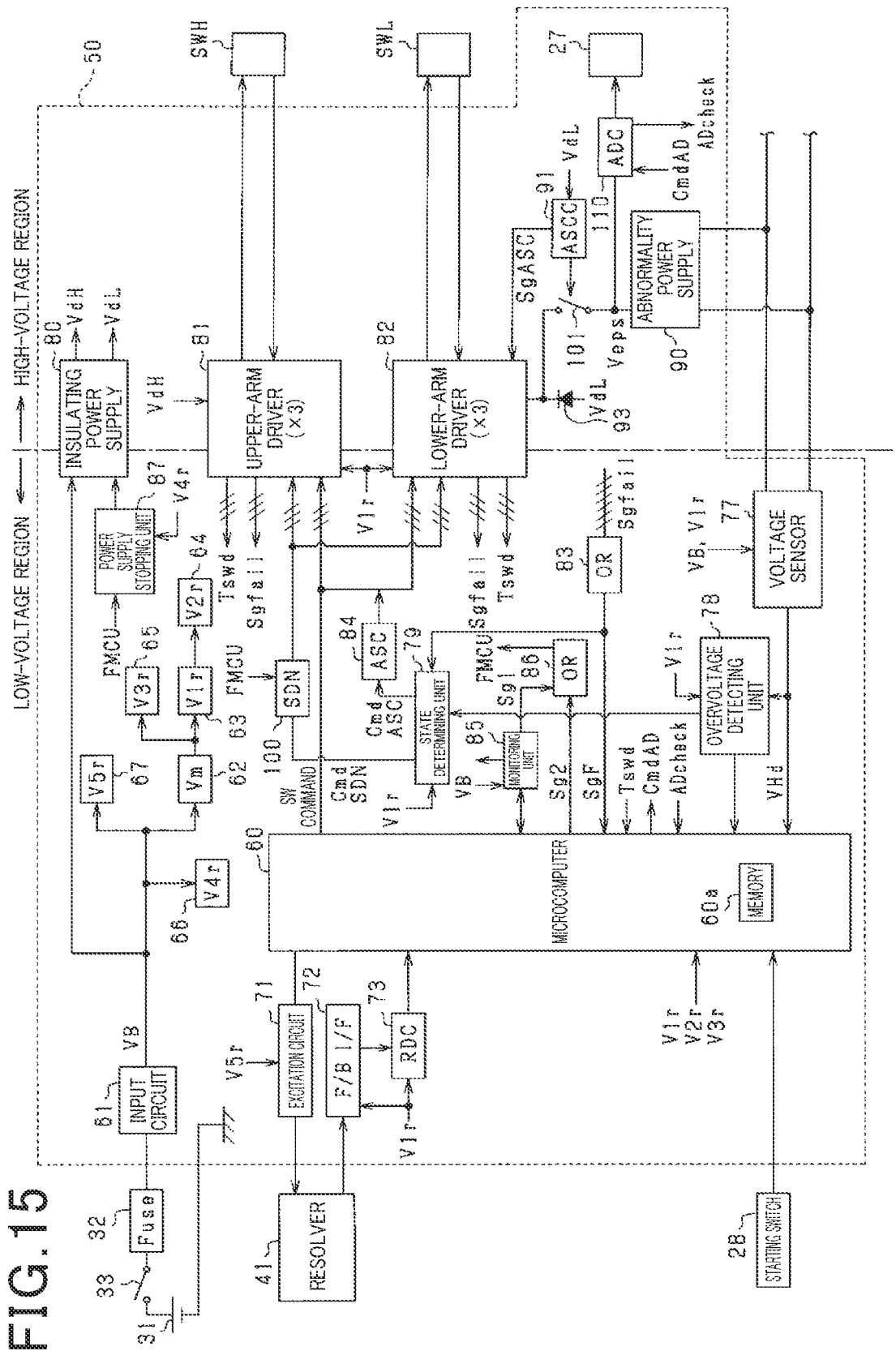
FIG. 15 is a diagram illustrating a control circuit according to a fifth embodiment and peripheral configurations thereof.
Figure 16:
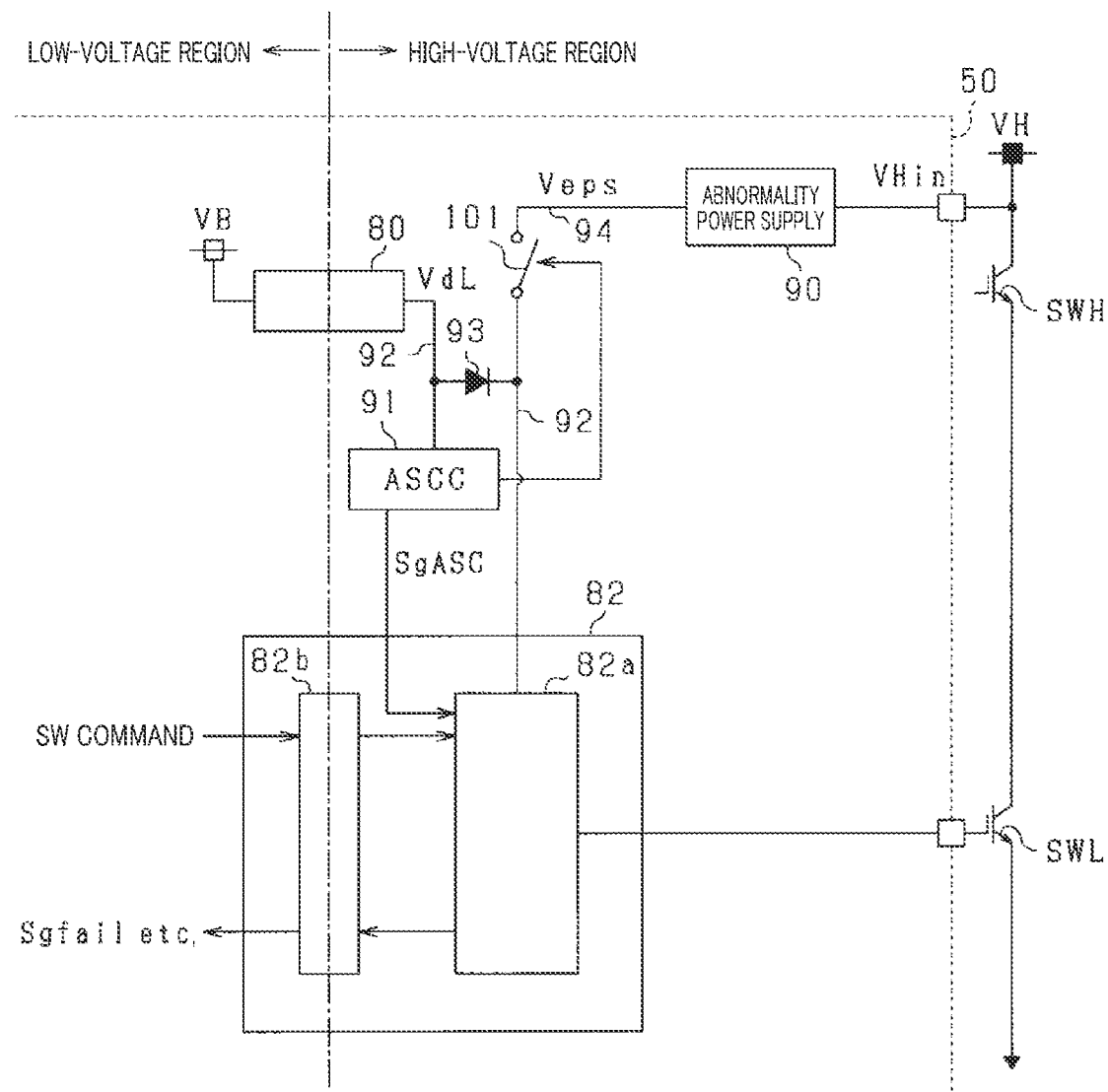
FIG. 16 is a diagram illustrating upper- and lower-arm drivers and peripheral configurations thereof.

A fifth embodiment will be described below with reference to the drawings, mainly focusing on differences with the first to fourth embodiments. According to the present embodiment, as shown in FIGS. 15 and 16, the configuration on the high-voltage region side of the control circuit 50 for performing the three-phase short-circuit control is partially modified. Here, in FIGS. 15 and 16, configurations that are shown in earlier FIGS. 2 and 3 are given the same reference numbers for convenience.

As shown in FIG. 15, a shutdown command unit 100 is provided in the low-voltage region of the control circuit 50. The shutdown command unit 100 is configured by a logic circuit. The abnormality notification signal FMCU from the OR circuit 86 is inputted to the shutdown command unit 100. When the logic of the abnormality notification signal FMCU is H, the shutdown command unit 100 forcibly sets the switching commands for the upper- and lower-arm drivers 81 and 82 of the three phases to the off-command, regardless of the switching commands from the microcomputer 60. As a result of this configuration, the three-phase short-circuit control can be started without awaiting decrease in the upper-arm drive voltage VdH. That is, the three-phase short-circuit control can be promptly started after an abnormality in the control circuit 50 occurs.

As shown in FIG. 16, the normal power supply path 92 is provided with an abnormality switch 101 instead of the abnormality diode 95. The high-voltage-side ASC command unit 91 switches the abnormality switch 101 to the on-state after the detected lower-arm drive voltage VdL starts to decrease. As a result, the abnormality drive voltage Veps starts to be supplied from the abnormality power supply 90 to the lower-arm drive unit 82a. Here, the high-voltage-side ASC command unit 91 may output the high-voltage-side ASC command SgASC to the lower-arm drive unit 82a after the switching commands are forcibly set to the off-command by the shutdown command unit 100.

According to the present embodiment, during a period from when the first and second interruption switches 23a and 23b are switched to on and an input voltage VHin of the abnormality power supply 90 starts to increase from 0, until the input voltage VHin of the abnormality power supply 90 becomes the terminal voltage VH of the smoothing capacitor 24 (terminal voltage of the high-voltage power supply 30), the abnormality power supply 90 is started at a timing at which the input voltage VHin thereof exceeds a prescribed voltage Vα. Specifically, the prescribed voltage Vα is a voltage at which the control unit of the abnormality power supply 90 is started. For example, this startup voltage may be set to a value that is same as a cancel threshold of the low-voltage erroneous operation prevention process.

Figure 17A:
Figure 17B:
Figure 17C:
Figure 17D:
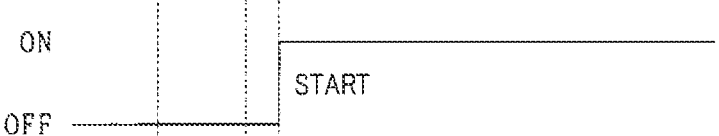
Figure 17E:
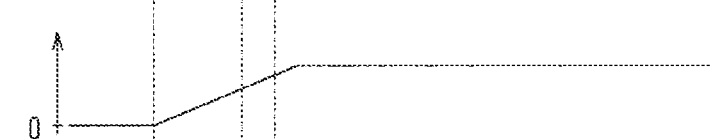
Figure 17F:
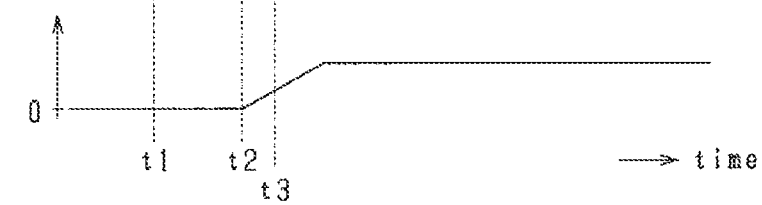

Operations of the abnormality power supply 90 and the like will be described with reference to FIGS. 17A to 17F. FIG. 17A shows transitions in the output voltage VB of the input circuit 61. FIG. 17B shows transitions in the input voltage VHin of the abnormality power supply 90. FIG. 17C shows transitions in the output voltages of the first to third low-voltage power supply circuits 63 to 65. FIG. 17D shows transitions in the operation state of the microcomputer 60. FIG. 17E shows transitions in the upper- and lower-arm drive voltages VdH and VdL that are outputted from the insulating power supply 80. FIG. 17F shows transitions in the output voltage Veps of the abnormality power supply 90. Here, in actuality, transitions in the respective output voltages of the first to third low-voltage power supply circuits 63 to 65 differ. However, in FIG. 17C, the transitions are shown in a simplified manner.

At time t1, the output voltage VB of the input circuit 61 reaches a predetermined voltage, and the output voltage of the first to third low-voltage power supply circuits 63 to 65 starts to increase. After the first and second interruption switches 23a and 23b are switched to the on-state, at time t2, the input voltage VHin of the abnormality power supply 90 exceeds the prescribed voltage Vα and the abnormality power supply 90 is started. Subsequently, at time t3, the microcomputer 60 is started.

As a result of the above-described configuration, the abnormality power supply 90 is in operation before the logic of the abnormality notification signal FMCU that is outputted from the OR circuit 86 is inverted to L. Therefore, as a result of the abnormality switch 101 being switched to on, the abnormality drive voltage Veps promptly starts to be supplied from the abnormality power supply 90 to the lower-arm drive unit 82a. Consequently, the three-phase short-circuit control can be promptly started.

According to the above-described present embodiment as well, the configuration for confirming whether the discharge control of the smoothing capacitor 24 can be performed normally that is described according to the first to fourth embodiments is applicable.

Variation Examples According to the Fifth Embodiment

The shutdown command unit 100 may forcibly set the switching command for any of the arm drivers among the upper- and lower-arm drivers 81 and 82 to the off-command. For example, the shutdown command unit 100 may set the switching command for only the upper-arm drivers 81 of the three phases to the off-command, and the lower-arm switches SWL of the three phases may be turned on with the decrease of the lower-arm drive voltage VdL as a trigger, in a manner similar to that described according to the first embodiment.

A trigger for forcibly setting the switching command to the off-command by the shutdown command unit 100 is not limited to the abnormality notification signal FMCU and may be another signal that instructs execution of the three-phase short-circuit control.

The configuration for forcibly turning off the upper-arm switches SWH is not limited to the configuration using the shutdown command unit 100. For example, the upper-arm switches SWH may be forcibly turned off by a configuration in which the upper-arm drivers 81 are stopped by the supply of the upper-arm drive voltage VdH to the upper-arm drivers 81 being stopped or a configuration in which the off-command is transmitted to the upper-arm drive units 81a through an insulating transmitting unit other than the upper-arm insulating transmitting unit 81b.

Sixth Embodiment

Figure 18:
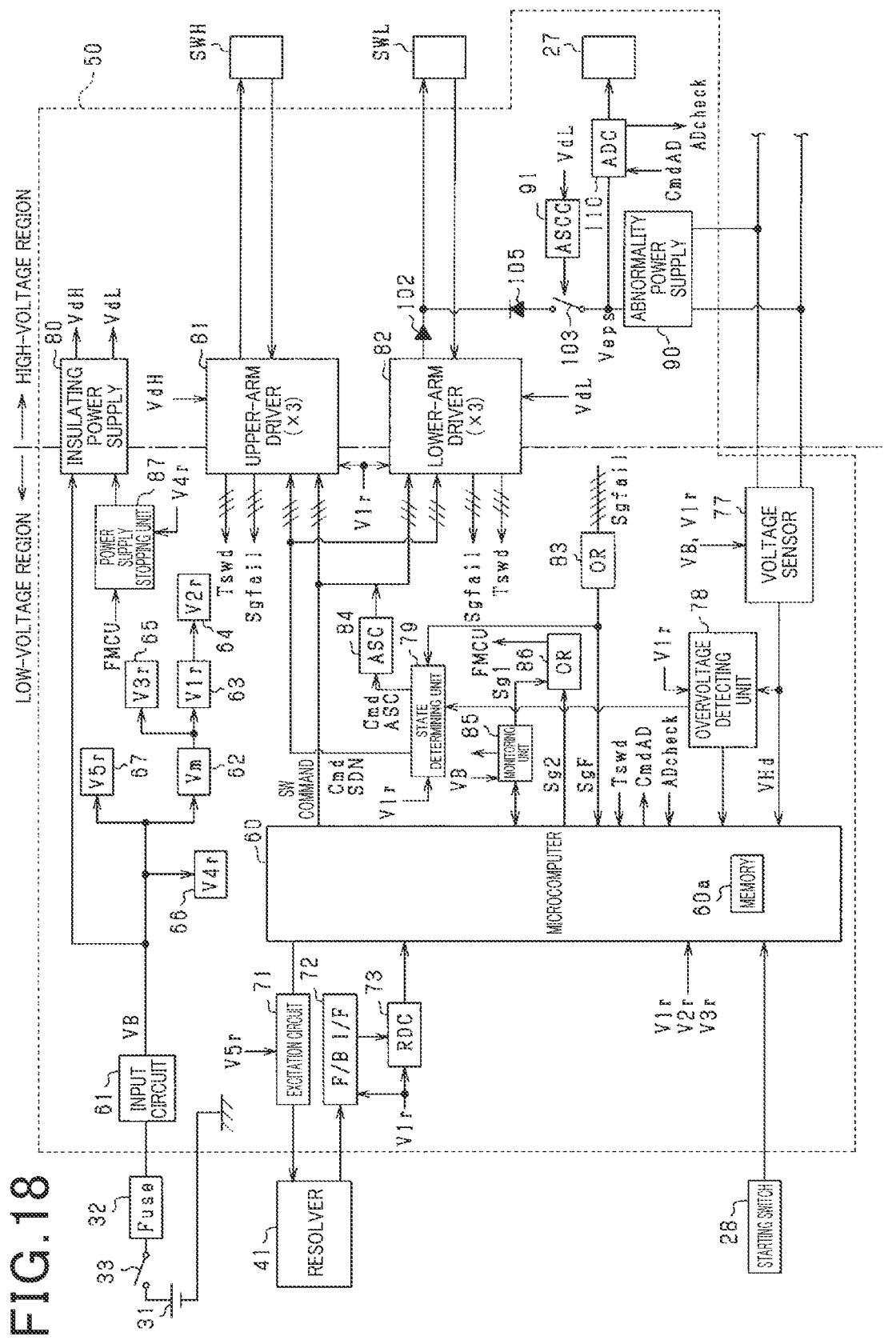
Figure 19:
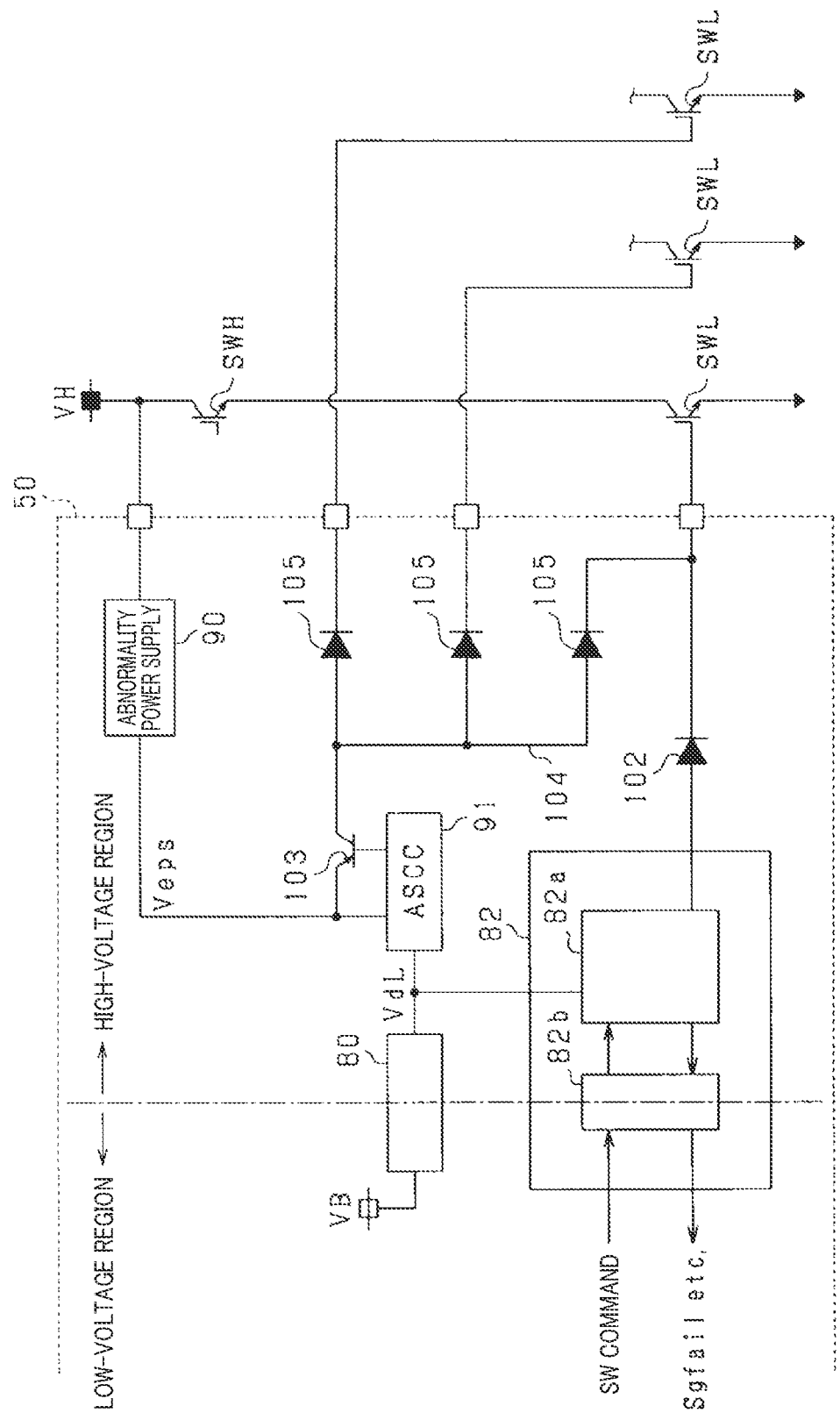
FIG. 19 is a diagram illustrating upper- and lower-arm drivers and peripheral configurations thereof.

A sixth embodiment will be described below with reference to the drawings, mainly focusing on differences with the fifth embodiment. According to the present embodiment, as shown in FIGS. 18 and 19, the configuration on the high-voltage region side of the control circuit 50 for performing the three-phase short-circuit control is partially modified. Specifically, the configuration is such that a voltage is directly supplied to the gate to perform the three-phase short-circuit control. Here, in FIGS. 18 and 19, configurations that are shown in earlier FIGS. 15 and 16 are given the same reference numbers for convenience. According to the present embodiment as well, the startup timing of the abnormality power supply 90 is identical to that according to the fifth embodiment.

In the high-voltage region of the control circuit 50, a first limiting diode 102 is provided on a gate charge/discharge path that connects the lower-arm drive unit 82a and the gates of the lower-arm switches SWL. The first limiting diode 102 is provided in a state in which an anode is connected on the lower-arm drive unit 82a side. Here, in FIG. 19, illustration of the gate discharge path of the lower-arm switches SWL is omitted.

The control circuit 50 includes an abnormality switch 103. The abnormality switch 103 connects the output side of the abnormality power supply 90 and a common path 104. The gate of each lower-arm switch SWL is connected to the common path 104 with each second limiting diode 105 therebetween.

The high-voltage-side ASC command unit 91 switches the abnormality switch 103 to the on-state after the detected lower-arm drive voltage VdL starts to decrease. As a result, the abnormality drive voltage Veps starts to be directly supplied from the abnormality power supply 90 to the gate of each lower-arm switch SWL. Consequently, the three-phase short-circuit control is performed. Here, a switching timing of the abnormality switch 103 to the on-state may be the same timing as the switching timing of the abnormality switch 103 to the on-state described according to the fifth embodiment.

According to the above-described present embodiment as well, the configuration for confirming whether the discharge control of the smoothing capacitor 24 can be performed normally that is described according to the first to fourth embodiments is applicable.

Other Embodiments

Here, the above-described embodiments may be modified in the following manner.

The discharge switch 27 is not limited to an N-channel metal-oxide-semiconductor field-effect transistor (MOSFET).

The abnormality power supply 90 is not limited to the switching power supply (specifically, the insulating-type or non-insulating-type switching power supply) and, for example, may be a series power supply or a power supply that is configured by a Zener diode.

According to the second to sixth embodiments, as described in the earlier variation examples according to the first embodiment, a configuration in which another power supply circuit is provided in preparation for when a coupler abnormality occurs, and the insulating power supply 80 is stopped when the output voltage of the other power supply circuit decreases and the three-phase short-circuit control is performed may be used.

As the drivers 81 and 82, a driver that is provided in only the high-voltage region without straddling the boundary between the low-voltage region and the high-voltage region may be used.

In the configuration shown in earlier FIG. 1, a step-up converter may be provided between the smoothing capacitor 24 and the interruption switches 23a and 23b.

The switch that configures the switching device unit is not limited to the IGBT and may, for example, be an N-channel MOSFET that includes a body diode therein.

The switches in each arm of each phase that configure the switching device unit may be two or more switches that are connected to each other in parallel. In this case, for example, combinations of the switches that are connected to each other in parallel may be a combination of an SiC switching element and an Si switching element or a combination of an IGBT and a MOSFET.

The controlled variable of the rotating electric machine is not limited to torque and, for example, may be a rotation speed of the rotor in the rotating electric machine.

The rotating electric machine is not limited to that which has three phases. In addition, the rotating electric machine is not limited to the permanent-magnet synchronous motor and may be a wound-field synchronous motor. Furthermore, the rotating electric machine is not limited to the synchronous motor and, for example, may be an induction motor. Moreover, the rotating electric machine is not limited to that which is used as a main onboard engine and may be used for other purposes such as an electric motor that configures an electric power steering apparatus or an electric compressor for air-conditioning.

The control unit and the method thereof described in the present disclosure may be implemented by a dedicated computer that is provided such as to be configured by a processor and a memory, the processor being programmed to provide one or a plurality of functions that are realized by a computer program. Alternatively, the control unit and the method thereof described in the present disclosure may be implemented by a dedicated computer that is provided by a processor being configured by a single dedicated hardware logic circuit or more. Still alternatively, the control unit and the method thereof described in the present disclosure may be implemented by a single dedicated computer or more. The dedicated computer may be configured by a combination of a processor that is programmed to provide one or a plurality of functions, a memory, and a processor that is configured by a single hardware logic circuit or more. In addition, the computer program may be stored in a non-transitory computer-readable storage medium that can be read by a computer as instructions performed by the computer.

While the present disclosure has been described with reference to embodiments thereof, it is to be understood that the disclosure is not limited to the embodiments and configurations. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. A control circuit for a power converter that is applicable to a system, the system including;
  a power supply;
  a rotating electric machine that is connected to the power supply;
  a power converter;
  an interruption switch that is provided on an electrical path that connects the power supply and the power converter;
  a smoothing capacitor that is connected on a side opposite the power supply from the interruption switch on the electrical path; and a series-connection body comprising a discharge resistor and a discharge switch that is connected in parallel to the smoothing capacitor, and the control circuit comprising:

a discharge command unit that outputs, in response to the interruption switch being set to an on-state and in response to a controlled variable of the rotating electric machine being controlled to a command value, a discharge command for the smoothing capacitor;

a discharge drive command unit that outputs a drive command for the discharge switch based on the discharge command that is outputted from the discharge command unit, the drive command including a plurality of on-pulse commands;

a drive circuit that is connected to a gate of the discharge switch and performs drive control of the discharge switch based on the drive command that is outputted from the discharge drive command unit;

an operation detecting unit that detects at least one of a gate voltage of the discharge switch and the drive command that is outputted from the discharge drive command unit; and a discharge determining unit that determines whether the discharge switch is in an on-state according to the plurality of on-pulse commands based on a detected signal of the operation detecting unit, wherein the discharge drive command unit and the drive circuit (i) are connected on a side opposite the power supply from the interruption switch on the electrical path and (ii) are configured to operate with the smoothing capacitor as a power supply source.

2. The control circuit for a power converter according to claim 1, wherein the plurality of on-pulse commands of the drive command continue over a period that is longer than a normal discharge period, the normal discharge period being a period from when a first on-pulse command is outputted until discharge of the smoothing capacitor is completed by the discharge switch being set to the on-state by the first on-pulse command.

3. The control circuit for a power converter according to claim 2, wherein:

the operation detecting unit detects a voltage at a connection point between the discharge resistor and the discharge switch; and the discharge determining unit determines whether the discharge drive command unit and the drive circuit are normal based on the voltage at the connection point that is detected by the operation detecting unit.

4. The control circuit for a power converter according to claim 3, wherein:

the system includes a voltage sensor that detects a terminal voltage of the smoothing capacitor; and the discharge command unit determines whether discharge of the smoothing capacitor using the discharge resistor is being performed normally based on a detection voltage of the voltage sensor after outputting the discharge command.

5. The control circuit for a power converter according to claim 2, wherein:

the system includes a voltage sensor that detects a terminal voltage of the smoothing capacitor; and the discharge command unit determines whether discharge of the smoothing capacitor using the discharge resistor is being performed normally based on a detection voltage of the voltage sensor after outputting the discharge command.

6. The control circuit for a power converter according to claim 1, wherein:

the operation detecting unit detects a voltage at a connection point between the discharge resistor and the discharge switch; and the discharge determining unit determines whether the discharge drive command unit and the drive circuit are normal based on the voltage at the connection point that is detected by the operation detecting unit.

7. The control circuit for a power converter according to claim 6, wherein:

the system includes a voltage sensor that detects a terminal voltage of the smoothing capacitor; and the discharge command unit determines whether discharge of the smoothing capacitor using the discharge resistor is being performed normally based on a detection voltage of the voltage sensor after outputting the discharge command.

8. The control circuit for a power converter according to claim 1, wherein:

the system includes a voltage sensor that detects a terminal voltage of the smoothing capacitor; and the discharge command unit determines whether discharge of the smoothing capacitor using the discharge resistor is being performed normally based on a detection voltage of the voltage sensor after outputting the discharge command.

9. A control circuit for a power converter that is applicable to a system, the system including:

a power supply;

a power converter;

an interruption switch that is provided on an electrical path that connects the power supply and the power converter;

a smoothing capacitor that is connected on a side opposite the power supply from the interruption switch on the electrical path; and a series-connection body comprising a discharge resistor and a discharge switch that is connected in parallel to the smoothing capacitor, and the control circuit comprising:

a discharge command unit that outputs a discharge command for the smoothing capacitor;

a discharge drive command unit that outputs a drive command for the discharge switch based on the discharge command that is outputted from the discharge command unit;

a drive circuit that is connected to a gate of the discharge switch and performs drive control of the discharge switch based on the drive command that is outputted from the discharge drive command unit;

an operation detecting unit that detects the drive command that is outputted from the discharge drive command unit;

a discharge determining unit that determines whether the discharge drive command unit is normal based on a detected signal of the operation detecting unit; and a signal interrupting unit that (i) transmits the drive command from the discharge drive command unit to the drive circuit by being set to a signal transmitting state and (ii) interrupts transmission of the drive command from the discharge drive command unit to the drive circuit by being set to a signal interrupting state, wherein
the discharge drive command unit outputs the drive command in response to the signal interrupting unit being set to the signal interrupting state.

* * * * *